United States Patent
Walker

(10) Patent No.: US 12,509,881 B2
(45) Date of Patent: Dec. 30, 2025

(54) VENTILATED STRUCTURAL PANELS AND METHOD OF CONSTRUCTION WITH VENTILATED STRUCTURAL PANELS

(71) Applicant: James Walker, Franconia, NH (US)

(72) Inventor: James Walker, Franconia, NH (US)

( * ) Notice: Subject to any disclaimer, the term of this patent is extended or adjusted under 35 U.S.C. 154(b) by 0 days.

(21) Appl. No.: 17/206,406

(22) Filed: Mar. 19, 2021

(65) Prior Publication Data

US 2021/0207362 A1     Jul. 8, 2021

Related U.S. Application Data

(60) Division of application No. 17/088,087, filed on Nov. 3, 2020, now Pat. No. 11,492,796, which is a division
(Continued)

(51) Int. Cl.
*E04C 2/38* (2006.01)
*B29D 24/00* (2006.01)
(Continued)

(52) U.S. Cl.
CPC .............. *E04C 2/38* (2013.01); *B29D 24/002* (2013.01); *E04B 1/10* (2013.01); *E04B 1/38* (2013.01); *E04B 1/7069* (2013.01); *E04B 1/7076* (2013.01); *E04B 2/709* (2013.01); *E04B 5/48* (2013.01); *E04B 9/02* (2013.01); *E04C 2/523* (2013.01); *E04D 3/357* (2013.01); *E04D 3/3606* (2013.01); *E04D 3/3608* (2013.01); *E04D 13/16* (2013.01); *E04D 13/17* (2013.01); *E04F 13/007* (2013.01); *E04F 17/04* (2013.01); *F16B 25/103* (2013.01); *F16B 35/06* (2013.01);
(Continued)

(58) Field of Classification Search
CPC ...... E04B 1/7069; E04B 1/7076; E04B 2/701; E04B 2/709; E04B 5/48; E04B 9/02; E04D 13/17; E04F 13/007; E04F 17/04; E04G 2009/028; E04C 2/523; E04C 2/38
USPC ........... 52/630, 800.1, 801.1, 801.11, 302.1, 52/302.3
See application file for complete search history.

(56) References Cited

U.S. PATENT DOCUMENTS 1,163,034 A * 12/1915 Phippen ................ E04D 12/004
                                                         52/302.1
2,010,294 A * 8/1935 Dovell ..................... E04B 2/821
                                                          174/505

(Continued)

FOREIGN PATENT DOCUMENTS

JP          03122350 A * 5/1991
JP          03137335 A * 6/1991
(Continued)

*Primary Examiner* — Robert Canfield
(74) *Attorney, Agent, or Firm* — Finch & Maloney PLLC

(57) ABSTRACT

A ventilated structural panel comprising a first sheet, having a long axis defining a length and a perpendicular short axis defining a width, a plurality of spacing structural elements, fixedly attached to the first sheet such that the yield strength of the panel is greater than the individual yield strength of the first sheet, and the plurality of spacing structural elements being formed such that a plurality of unobstructed pathways are created for air to move from at least one edge of the panel to at least one of an opposite and an adjacent edge of the panel, wherein the first sheet is the only sheet in the panel.

14 Claims, 37 Drawing Sheets

Related U.S. Application Data of application No. 16/357,825, filed on Mar. 19, 2019, now Pat. No. 10,822,790, which is a continuation-in-part of application No. 15/795,306, filed on Oct. 27, 2017, now abandoned, which is a division of application No. 15/459,620, filed on Mar. 15, 2017, now abandoned, which is a division of application No. 14/711,943, filed on May 14, 2015, now Pat. No. 9,604,428, which is a continuation-in-part of application No. 14/099,100, filed on Dec. 6, 2013, now Pat. No. 9,091,049, and a continuation-in-part of application No. 13/782,406, filed on Mar. 1, 2013, now Pat. No. 9,050,766, said application No. 14/099,100 is a continuation-in-part of application No. 13/539,919, filed on Jul. 2, 2012, now Pat. No. 8,615,945, which is a continuation-in-part of application No. 13/016,320, filed on Jan. 28, 2011, now Pat. No. 8,534,018, which is a continuation-in-part of application No. 12/987,832, filed on Jan. 10, 2011, now Pat. No. 8,490,355.

(60) Provisional application No. 61/376,333, filed on Aug. 24, 2010.

(51) Int. Cl.

| | | |
|---|---|---|
| *E04B 1/10* | (2006.01) | |
| *E04B 1/38* | (2006.01) | |
| *E04B 1/70* | (2006.01) | |
| *E04B 2/70* | (2006.01) | |
| *E04B 5/48* | (2006.01) | |
| *E04B 9/02* | (2006.01) | |
| *E04C 2/10* | (2006.01) | |
| *E04C 2/14* | (2006.01) | |
| *E04C 2/52* | (2006.01) | |
| *E04D 3/35* | (2006.01) | |
| *E04D 3/36* | (2006.01) | |
| *E04D 13/16* | (2006.01) | |
| *E04D 13/17* | (2006.01) | |
| *E04F 13/00* | (2006.01) | |
| *E04F 17/04* | (2006.01) | |
| *F16B 25/10* | (2006.01) | |
| *F16B 35/06* | (2006.01) | |
| *E04B 1/32* | (2006.01) | |
| *E04C 2/34* | (2006.01) | |
| *E04G 9/02* | (2006.01) | |

(52) U.S. Cl.
CPC ........ *F16B 35/065* (2013.01); *B32B 2419/00* (2013.01); *B32B 2607/00* (2013.01); *E04B 2001/3276* (2013.01); *E04C 2002/3488* (2013.01); *E04G 2009/028* (2013.01); *Y10T 29/49963* (2015.01)

(56) References Cited

U.S. PATENT DOCUMENTS

| | | | | |
|---|---|---|---|---|
| 3,124,847 A * | 3/1964 | Charniga, Jr. | ........ | E04B 1/7069 |
| | | | | 52/603 |
| 3,318,056 A * | 5/1967 | Thompson | ............ | E04B 2/709 |
| | | | | 52/603 |
| 3,343,474 A * | 9/1967 | Sohda | ........... | F24F 7/04 |
| | | | | 52/302.3 |
| 3,387,420 A * | 6/1968 | Long | ........... | E04D 5/10 |
| | | | | 428/167 |
| 3,438,164 A * | 4/1969 | Werner | ............ | A47B 47/05 |
| | | | | 52/630 |
| 3,595,728 A * | 7/1971 | Robson | ............ | G21C 11/088 |
| | | | | 976/DIG. 162 |
| 4,156,999 A * | 6/1979 | Avery | ............ | E04G 11/50 |
| | | | | 52/841 |
| 4,159,604 A * | 7/1979 | Burrell | ............ | E04G 11/50 |
| | | | | 52/841 |
| 4,338,994 A * | 7/1982 | Hewing | ............ | F28F 1/20 |
| | | | | 165/53 |
| 4,446,661 A * | 5/1984 | Jonsson | ............ | E04F 13/0869 |
| | | | | 52/95 |
| 4,506,483 A * | 3/1985 | Phalen, Jr. | ............ | E04D 11/00 |
| | | | | D25/138 |
| 4,576,221 A * | 3/1986 | Fennesz | ............ | F24D 5/00 |
| | | | | 165/49 |
| 4,637,184 A * | 1/1987 | Radtke | ............ | E04F 15/123 |
| | | | | 52/302.1 |
| 4,802,321 A * | 2/1989 | Menchetti | ............ | E04B 9/045 |
| | | | | 52/801.1 |
| 4,852,314 A * | 8/1989 | Moore, Jr. | ............ | E04D 13/1618 |
| | | | | 52/95 |
| 5,069,950 A * | 12/1991 | Crookston, Sr. | ....... | E04D 13/172 |
| | | | | 52/302.1 |
| 5,285,610 A * | 2/1994 | Schaaf | ............ | E04C 3/22 |
| | | | | 52/223.7 |
| 5,353,563 A * | 10/1994 | White | ............ | E04C 2/386 |
| | | | | 52/801.1 |
| 5,377,468 A * | 1/1995 | Repasky | ............ | E04D 13/0477 |
| | | | | 52/408 |
| 5,473,847 A * | 12/1995 | Crookston | ............ | E04C 2/205 |
| | | | | 52/95 |
| 5,596,847 A * | 1/1997 | Stephenson | ............ | E04D 13/172 |
| | | | | 52/95 |
| 5,634,315 A * | 6/1997 | Toya | ............ | E04B 1/10 |
| | | | | 52/741.1 |
| 5,666,772 A * | 9/1997 | Betty | ............ | E04D 11/00 |
| | | | | 52/302.1 |
| 5,928,076 A * | 7/1999 | Clements | ............ | H05K 9/0041 |
| | | | | 174/383 |
| 5,930,966 A * | 8/1999 | Wood | ............ | E04G 11/10 |
| | | | | 52/630 |
| 6,017,597 A * | 1/2000 | Minakami | ............ | E04C 2/36 |
| | | | | 52/576 |
| 6,061,978 A * | 5/2000 | Dinwoodie | ............ | F24S 25/61 |
| | | | | 52/302.1 |
| 6,279,284 B1 * | 8/2001 | Moras | ............ | E04F 13/007 |
| | | | | 52/483.1 |
| 6,298,620 B1 * | 10/2001 | Hatzinikolas | ....... | E04F 13/0869 |
| | | | | 52/302.1 |
| 6,393,796 B1 * | 5/2002 | Goettl | ............ | E04D 12/004 |
| | | | | 52/302.1 |
| 6,449,915 B1 * | 9/2002 | Park | ............ | E04B 1/70 |
| | | | | 52/302.1 |
| 6,598,366 B2 * | 7/2003 | Hsieh | ............ | E04F 15/02411 |
| | | | | 52/509 |
| 6,668,504 B2 * | 12/2003 | Hughart | ............ | E04B 2/7457 |
| | | | | 181/294 |
| 6,912,821 B2 * | 7/2005 | Richards | ............ | B32B 27/04 |
| | | | | 52/309.1 |
| 6,990,775 B2 * | 1/2006 | Koester | ............ | E04B 1/70 |
| | | | | 52/783.17 |
| 7,165,369 B2 * | 1/2007 | Jandl | ............ | E04C 2/34 |
| | | | | 52/145 |
| 7,334,373 B2 * | 2/2008 | Richards | ............ | B32B 3/20 |
| | | | | 52/258 |
| D589,171 S * | 3/2009 | Gleeson | ............ | D25/163 |
| 7,617,647 B2 * | 11/2009 | Turner | ............ | E04F 15/08 |
| | | | | 52/390 |
| D608,020 S * | 1/2010 | Gleeson | ............ | D25/163 |
| 7,818,922 B2 * | 10/2010 | Ellis | ............ | E04D 13/1637 |
| | | | | 52/95 |
| 8,046,969 B2 * | 11/2011 | Dagher | ............ | E04D 13/17 |
| | | | | 52/794.1 |
| 8,051,611 B2 * | 11/2011 | Serino | ............ | E04B 1/762 |
| | | | | 52/302.1 |
| 8,621,799 B2 * | 1/2014 | Sade | ............ | E04B 1/26 |
| | | | | 52/302.1 |
| 8,635,822 B2 * | 1/2014 | Walker | ............ | E04D 13/17 |
| | | | | 52/302.1 |

(56) References Cited

U.S. PATENT DOCUMENTS

| | | | | |
|---|---|---|---|---|
| 8,776,450 B2 * | 7/2014 | Lee | E04D 13/076 | 52/95 |
| 8,881,476 B2 * | 11/2014 | Sullivan | B29C 44/445 | 165/56 |
| 9,359,775 B2 * | 6/2016 | Thorton | E04F 15/02177 | |
| 10,480,188 B2 * | 11/2019 | Power | E04F 13/0875 | |
| 10,519,673 B2 * | 12/2019 | Joshi | E04F 13/007 | |
| 10,634,371 B2 * | 4/2020 | Radzinsky | F24F 5/0021 | |
| 10,655,321 B2 * | 5/2020 | Olson | E04F 13/0864 | |
| 10,731,341 B2 * | 8/2020 | Lambach | B32B 15/046 | |
| 11,035,127 B2 * | 6/2021 | Joshi | E04B 1/665 | |
| 11,268,278 B2 * | 3/2022 | Sing | E04B 1/2403 | |
| 11,274,437 B2 * | 3/2022 | Gonzales | B32B 27/12 | |
| 2002/0184850 A1 * | 12/2002 | Kamenomostski | E04C 2/08 | 52/800.1 |
| 2003/0126806 A1 * | 7/2003 | Ellis | E04D 13/17 | 52/302.1 |
| 2004/0065043 A1 * | 4/2004 | Foderberg | E04B 2/58 | 52/432 |
| 2004/0200168 A1 * | 10/2004 | Takagi | E04G 11/10 | 52/421 |
| 2006/0179748 A1 * | 8/2006 | Schmidt | E04B 1/80 | 52/302.1 |
| 2007/0204541 A1 * | 9/2007 | Sade | E04B 2/707 | 52/302.1 |
| 2008/0034690 A1 * | 2/2008 | Gartz | E04B 1/70 | 52/309.4 |
| 2008/0148659 A1 * | 6/2008 | Schiffmann | B29D 99/0014 | 52/800.1 |
| 2008/0260993 A1 * | 10/2008 | Koester | E04F 13/047 | 52/302.1 |
| 2009/0007509 A1 * | 1/2009 | Jordan | E02D 31/10 | 52/302.1 |
| 2009/0019809 A1 * | 1/2009 | Kiji | B23K 9/18 | 52/630 |
| 2009/0090083 A1 * | 4/2009 | Dagher | E04D 13/17 | 52/741.1 |
| 2009/0183450 A1 * | 7/2009 | Lu | E04C 2/06 | 52/799.12 |
| 2010/0146884 A1 * | 6/2010 | Lu | E04C 2/324 | 52/220.2 |
| 2010/0186305 A1 * | 7/2010 | Larimore | E04F 15/022 | 52/302.1 |
| 2010/0189953 A1 * | 7/2010 | Lim | E04D 11/00 | 428/140 |
| 2010/0229484 A1 * | 9/2010 | Carolan | E04F 13/0825 | 52/302.1 |
| 2010/0300026 A1 * | 12/2010 | Candiracci | E04B 2/847 | 52/309.4 |
| 2014/0246146 A1 * | 9/2014 | Walker | E04C 2/34 | 156/245 |
| 2014/0373472 A1 * | 12/2014 | Plummer | E04F 15/185 | 52/302.3 |
| 2015/0007508 A1 * | 1/2015 | Valtanen | E04B 5/48 | 52/302.1 |
| 2015/0096248 A1 * | 4/2015 | Tebo | E04D 13/17 | 52/302.3 |
| 2015/0176283 A1 * | 6/2015 | Smiley, Jr. | E04D 13/172 | 52/302.1 |
| 2016/0160502 A1 * | 6/2016 | Brousseau | E04C 2/205 | 52/309.4 |
| 2017/0044781 A1 * | 2/2017 | Lo | E04G 9/04 | |

FOREIGN PATENT DOCUMENTS

| | | | | |
|---|---|---|---|---|
| JP | 04293838 A | * | 10/1992 | |
| JP | 06073807 A | * | 3/1994 | |
| JP | 11303238 A | * | 11/1999 | |
| JP | 2004092312 A | * | 3/2004 | E04B 1/7612 |
| JP | 2006070610 A | * | 3/2006 | |
| JP | 2006207219 A | * | 8/2006 | |

* cited by examiner

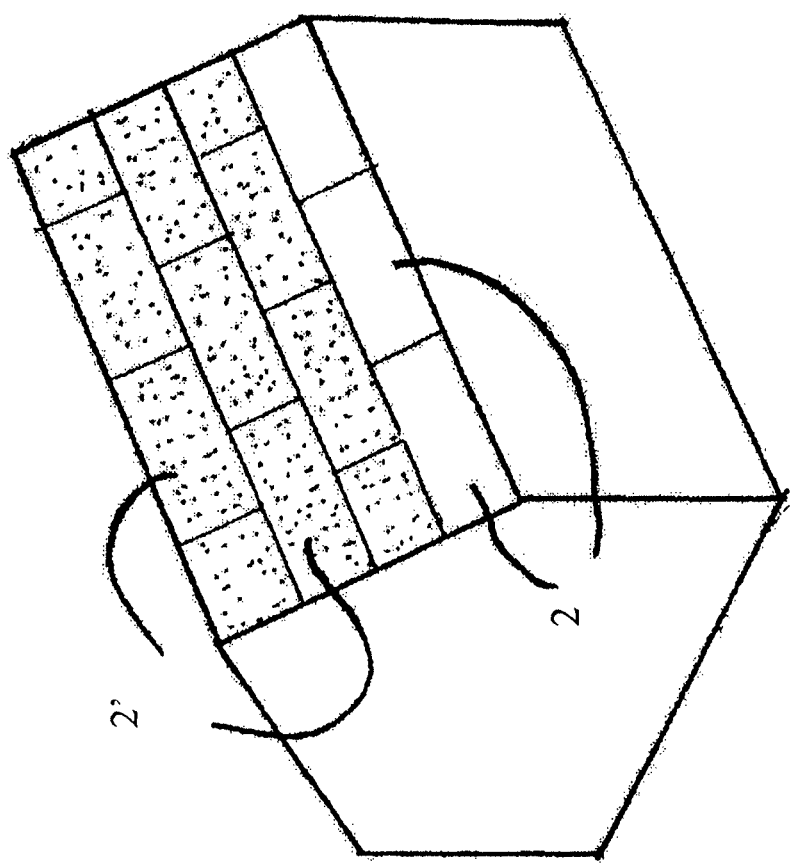

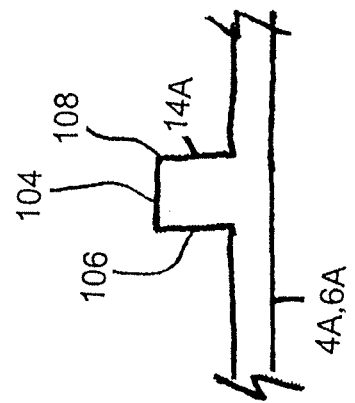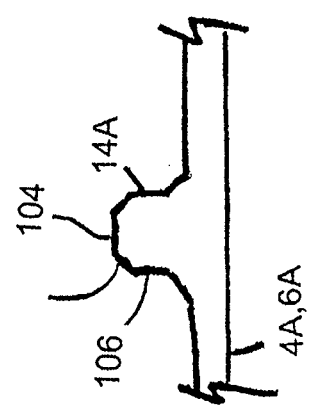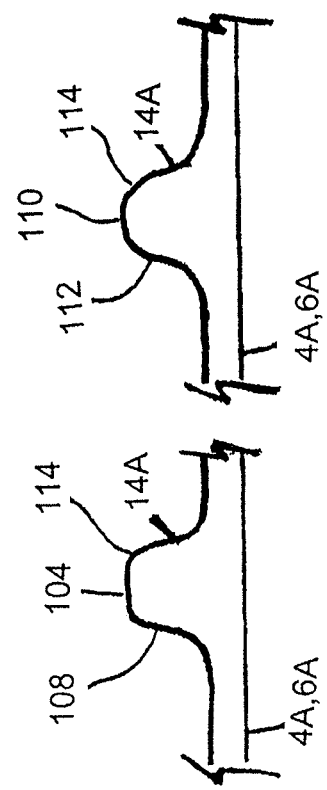

VENTILATED STRUCTURAL PANELS AND METHOD OF CONSTRUCTION WITH VENTILATED STRUCTURAL PANELS

PRIORITY

This application claims priority to U.S. Ser. Nos. 17/088,087, 16/357,825, 14/988,065, 15/795,306, 15/459,620, 14/711,943, 13/782,406, 14/099,100, 13/539,919, 13/016,320 and 12/987,832, and U.S. Ser. No. 61,376,333, which are all incorporated by reference into the present disclosure as if fully restated herein. Any conflict between the incorporated material and the specific teachings of this disclosure shall be resolved in favor of the latter. Likewise, any conflict between an art-understood definition of a word or phrase and a definition of the word or phrase as specifically taught in this disclosure shall be resolved in favor of the latter.

FIELD OF THE INVENTION

Residential and commercial sheathing for roofs, walls, floors, and ceilings.

BACKGROUND OF THE INVENTION

Sheathing is an essential component of any residential or commercial structure and provides structural support for roofs, walls and floors, as well as providing a surface of sufficient thickness and strength for the attachment of roofing materials such as asphalt shingles and metal roofing, siding materials such as wood clapboards or vinyl siding and flooring finishes such as tile, wood, hardwood, laminates, vinyls or carpets and the like.

Sheathing has traditionally been supplied in 4'×8' sheets, made of plywood or OSB, which provide a desirable modular size that can be handled by one worker. The means of attachment depends on the function, thickness and strength requirements of the application and may include mechanical fasteners such as nails or staples and/or adhesives. Roofs, walls, and flooring use sheets of similar sizes, though varied thickness.

Complex, costly, and non-commercially feasible systems have been proposed to incorporate in some manner ventilation systems into sheathing, but they lack the structural strength and other benefits of the present invention.

SUMMARY OF THE INVENTION

Wherefore, it is an object of the present invention to overcome the above mentioned shortcomings and drawbacks associated with the prior art by providing a ventilated structural panel that allows for ventilation out of and throughout a structure, while simultaneously providing a panel of substantially increased strength, formed of readily available construction materials, for small additional cost.

Another object of the present invention is to provide a ventilated structural panel comprising a first sheet, having edges that define a horizontal axis with a first horizontal edge and a second horizontal edge, and vertical axis with a first vertical edge and a second vertical edge. The panel additionally comprises a second sheet being of substantially the same planar dimensions as the first sheet and having edges that define a horizontal axis and vertical axis, with a first horizontal edge and a second horizontal edge and a first vertical edge and a second vertical edge; the first and second sheet being parallel in plane and preferably matched in at least one of the vertical axis and the horizontal axis. A plurality of spacing structural elements fixedly attaches the first sheet to the second sheet, such that the strength of the combined panel is multiple times greater than the combined individual strength of the first and second sheet. The ventilated structural panel can be at least semi-permeable to the passage of gases and liquids and the first or bottom sheet of the panel could have one or more perforations.

The invention is an interlocking construction panel of the same size and approximate weight of conventional sheathing products that incorporates integral ventilation into the structure. The invention may be used as a conventional sheathing and is attached with the same mechanical methods of nailing and/or adhesives. It is cut and fitted in the same manner. It interlocks to provide continuity of strength and ventilation.

The panel is engineered such that it provides the same or superior strength of conventional methods of providing construction strength and ventilation, with fewer materials. The materials involved in the construction of the panel are relatively inexpensive and readily available.

The panels facilitate the use of a wide variety of insulation possibilities without the need for special consideration for ventilation, since the ventilation is integral with the panels. This is useful for common fiberglass as well as blown products such as fiberglass, Rockwool, cellulose and other products. This is especially useful for the new high performance spray foam expanding insulations that are becoming popular because of their high energy efficient performance and ability to seal infiltration, as the foams can break, plug or destroy conventional foam, plastic, or cardboard ventilation products, or intrude into the seams.

The panels could be combined with a multitude of construction materials and methods in the same way conventional sheathing is used today. The panels could be used with conventional soffit and ridge vents by cutting the sheathing on the panels for access to the ventilation cavity. Drip edges would have to have an extended leg to cover the side ventilation or it could be blocked with conventional trim.

The panel may be constructed sheets of commonly available 4'×8' sheathing of a thickness determined by structural and roof fastening requirements, but may preferably vary from ¼" to ½" in thickness, and more preferably vary from ⅜" to ¾" in thickness. The top and bottom sheets may also vary in thickness.

The two sheets are attached to each other via the spacing structural elements, with adhesive and/or mechanical means such as nailing, stapling, screwing or machine impressed metal connections, so as to provide for the transfer of forces.

In essence, the two sheets function as the top and bottom chords of a truss or "I" beam providing superior strength, load carrying capacity, and resistance to deflection (stiffness). As a result, rafter or stud or purloin spacing may be increased where these panels are used, which would reduce material requirements, allowing the elimination of rafters and trusses with the greater spacing.

The spacing structural elements may protrude beyond two contiguous edges of the panel, and the spacing structural elements may be chamfered to enhance interlocking with adjacent panels. The spacing structural elements would likewise be indented on the two opposite contiguous edges.

Another embodiment of the invention is a panel comprised of two sheets of the same size (i.e., same area, but perhaps different thicknesses) connected to each other with a matrix of crossed spacing structural elements such that the combined entity is one structural panel. Ideally, the panel is the same size as conventional building sheathing, generally 4'×8', but can be of any size or thickness. The sheets are connected so as to be are parallel in plane and matched in the vertical axis, one on top of the other, such that they can be used in place of traditional sheathing materials currently used in building construction such as plywood sheathing, OSB sheathing and other composite sheathing materials.

In one embodiment, the panel includes a first and a second 4'×8' sheet of plywood, Oriented Strand Board (OSB), or a composite board of wood and/or plastic, each sheet having a thickness of ¼" to ¾" depending on the application. Roofs would usually consist of the two sheets measuring ¼" to ⅝" in thickness, depending on strength and span requirements and shingle attachment requirements, and whether the shingles are attached by staples or nails. Wall sheathing sheet thickness would also be of ¼" to ½" thickness depending on strength requirements. The top wear layer of the flooring panel will usually have a ½" to ¾" finish layer depending on strength requirements and floor covering.

Blocks may be used as the as the spacing structural elements, spacing the sheets ideally 1½" from each other. Blocks of a preferably of square or rectangular form, but the blocks could be of any shape or size, including circular, oval, regular polygons, and irregular shapes. The spacing can vary depending on the application and ventilation requirements—more spacing not only enhances ventilation and potentially increases the strength of the assembly, but would also require closer spacing of the blocks or spacers. While panels constructed with blocks would not have the degree of added strength as panels constructed of elongated members (discussed below), panels constructed of blocks would potentially be less expensive, and provide sufficient increased strength for construction with conventional 16 or 24 inch spaced of stud, rafter, truss, or joist is used.

The blocks are generally spaced from 1 to 12 times their own width apart horizontally and vertically. The specific spacing would depend on the sheet thickness and strength requirements. Blocks were found to only increase the strength of the panel, over the combined individual strength of the separate sheets comprising the panel, by approximately one half the amount of increase as panels utilizing rectangular shaped elongated members. But, using blocks does offer additional construction possibilities over rectangular elongated members due to the increased contagious space inside a panel offered by using blocks compared to using a matrix of elongated members. The blocks can be oriented on the same axis of the sheets or arranged on an angle of preferably 45°; but other orientations, such as 30° or 60°, are possible depending on the application. The angled orientation strengthens the plywood or OSB assembly.

Another embodiment of the invention uses spacing structural elements consisting of a matrix of rectangular shaped elongated members, preferably comprised of wood members with a square cross section, arranged in layers, each layer oriented perpendicular to the next, and each layer interconnected to each adjacent layer or adjacent sheet with mechanical means and/or adhesives. The individual elongated members would ideally be of ¾"×¾", but could be larger or smaller. The individual elongated members would ideally be long enough to stretch from one edge of a sheet to another—this required length varying depending on the orientation of the elongated member.

The individual elongated members would be aligned in layers and spaced, parallel, apart from one another preferably between 1 to 18 times the thickness of the elongated member, or ¾" to 13.5 inches for elongated members with cross sections measuring ¾"×¾", and more preferably between 5 and 16 times the thickness of the elongated member, and most preferably between 8 and 12 times the thickness of the elongated member. In another embodiment, each elongated member preferably measures between 0.25 and 1.50 inches in height and between 0.25 and 1.50 inches in width, more preferably measures between 0.5 and 1.0 inches in height and between 0.5 and 1.0 inches in width, and most preferably measures between 0.7 and 0.8 inches in height and between 0.7 and 0.8 inches in width. The matrix of elongated members could consist of two layers perpendicular to each other or of multiple successive perpendicular layers. The matrix can be attached to the sheets either parallel to the sheet axis or on an angle. If an angular orientation is used, the elongated members will be ideally oriented 45° to each axis of both sheets, but other orientations such as 30° or 60° are possible depending on the application. The length of the elongated members would be of a length that they stretched from a first edge of a first sheet, to a second edge of the first sheet. Chamfered elongated members would preferably measure the "edge to edge" length of a sheet, but would be shifted in the direction of the chamfered end. This would allow for the terminal chamfered end of a given elongated member to extend into a mating indented end on an abutting panel, while simultaneously allowing room for a chamfered end on an opposing abutting panel to mate with the indented end of the given elongated member. For example, chamfered mating elongated members would measure 48 inches and 96 inches in an orientation parallel to the sheet axis, and chamfered mating elongated members with a 45° orientation would measure approximately 69 inches or 137 inches respectively at the greatest measurements.

In another embodiment, the indented end of an elongated member can have a concave face that will accept all or a portion of the chamfered end of a mating elongated member. In such an embodiment, the total length of the elongated member would preferably be extended by the length in which the chamfered end recesses within the concave portion of the indented end.

In the manufacturing of the panels, the elongated members may initially be secured to the sheets at lengths greater then required, and then be trimmed to finished length at a later point in the manufacturing process.

The spacing structural elements can also be constructed of elongated members comprised of a plurality of plywood veneers, each veneer being typically ⅛" thick. This plywood matrix would be built up by multiple layers of veneered elongated members, each veneered elongated member being ideally ½' to ¾" thick and spaced from ½" to 4" apart. The plywood matrix would consist of a first layer of similarly shaped and parallel aligned veneered elongated members, followed by one or more additional layers laid perpendicular to the first and/or immediately preceding layer, until a multi-layer plywood matrix of desired thickness is assembled. The veneered elongated members would be attached with adhesives. The resulting plywood matrix can be attached to the sheets either parallel to the sheet axis or on an angle. If an angular orientation is used, the veneered elongated members will be ideally oriented 45° to each axis of both sheets, but other orientations such as 30° or 60° are possible. The length of the veneered elongated members would be similar to that of the non-veneered elongated members above depending, depending on the angle of the orientation of the members to the axis of the sheets, and whether or not the veneered elongated members were chamfered.

In all cases, including spacing blocks and elongated members, the spacing structural elements can protrude on two contiguous edges and be chamfered to enhance interlocking with adjacent panels. The spacing structural elements can be similarly matingly indented on the two opposite contiguous edges. The extension is normally less than or equal to 1 inch and ideally between ½' to ¾". Additionally, the elongation and indentation may be modified to provide for both contiguous mating of adjacent panels and a spacing gap between adjacent panels of between 0.0625 inches and 0.25 inches. For example, the elongated members length could be increased by, for example, ⅛ inch, or the indentation could be reduced by ⅛ inch, or both, such that the elongated members may mating abut, but the neighboring first and second sheets would be spaced between 0.0625 inches and 0.25 inches apart.

The panels with all attributes herein described can also be manufactured similarly to plywood except that the two exterior sheets are instead separated by a plurality of elongated members that are spaced apart and, in layers, are laid on to one another perpendicular to each other to permit the passage of air and the transfer of forces. These elongated members function as the spacing structural elements. The number of elongated members can vary as can the thickness of the elongated members, the width of the elongated members, the spacing of the elongated members and the orientation of the elongated members, for instance, some may be oriented on an or arranged in the same axis of the sheets.

In all cases where there are matrices of elongated members acting as the spacing structural elements, there may be one, two, three, or four layers of elongated members, and where veneer elongated members are used, up to twelve layers may be used. Each additional layer potentially adds cost and weight, but also potentially adds strength.

The apparatus may include three layers of elongated members, with two layers perpendicular to one another and diagonally oriented to the axis of the sheets, and one layer perpendicular to an axis of the sheets. The apparatus may include three layers of elongated members, with two layers perpendicular to one another and each perpendicular to an axis of the sheets, and one layer diagonally oriented to the axes of the sheets. The apparatus may include four layers of elongated members, with two layers perpendicular to one another and each perpendicular to an axis of the sheets, and two layers perpendicular to one another and diagonally oriented to the axes of the sheets. The apparatus may include three or four layers of elongated members, with each layer oriented perpendicular to the next, and all layers either perpendicular to an axes of the sheets, or all layers diagonally oriented to the axes of the sheets.

In one embodiment, the individual sheets for each panel are spaced equally apart from each other in parallel planes and in the same vertical axis, ideally at a distance of 1½" from each other, with a matrix of spacing structural elements or members arranged in a cross hatch pattern between the two sheets. The matrix of members would ideally consist of a first layer of elongated members, each parallel, coplanar, and spaced equally from one another, the first layer being perpendicular to a second layer of elongated members, each parallel, coplanar, and spaced equally from one another. Each elongated member would generally have a square cross section and would extend in length from one side of the panel to another. For a perpendicular arrangement to the panels, where the panels are spaced at 1½" apart, this would require members of ¾" square faces with lengths of 48" and 96", or, if chamfered, longer, depending on the length of the chamfer.

A layer of screening (e.g., fiberglass, aluminum, plastic) could be affixed between the first and the second layers of elongated members. This would aid in adhesion and/or fastening of elongated members, and would facilitate the running of wires through the interior of the panels.

The elongated members are generally spaced apart from a neighboring elongated member in the same layer from 1 to 12 times their own width, more preferably 3 to 9 times their own width, and most preferably 5 to 7 times their own width. The specific spacing would depend on the sheet thickness and strength requirements.

For roofing sheathing, the top layer would preferably be laid in the long horizontal direction, and have a length of 96 inches, with a repeat of 5⅝" for shingle attachment if using nails for shingles and the object is to nail into the elongated member. The panel faces could be stamped, painted, or otherwise visibly marked with the orientation of the underlying matrix for ease of use by the workman.

The elongated members would usually be oriented perpendicular to one another on the same axis of the sheets but other orientations are possible depending on the application. Testing indicates that the perpendicular orientation significantly strengthens the plywood or OSB assembly more than any other orientation, allowing the use of thinner exterior sheets. Tests have demonstrated that a strength increase in bending stiffness for an assembly of two ¼ inch sheets, with a perpendicular matrix of two layers of ¾"×¾" elongated members spaced 5 inches apart, has a bending strength approximately 10 times greater than a single sheet of ½" of plywood alone.

The elongated members of the matrix can consist of square members made of wood, wood composite, plastic, or similar material, arranged perpendicular or close to perpendicular for an offset matrix, and interconnected to each other with mechanical means and/or adhesives.

The individual matrix members would ideally be ¾"×¾" square, and long enough to extend beyond the panel edge. The size of the elongated members could be larger or smaller and long enough to complete the required matrix of the sheets, which depends on the orientation, and extend to or beyond one edge. Spacing would be 1 to 12 times the thickness of the elongated member or ¾" to 9 inches. The matrix of "elongated members" could consist of two layers perpendicular to each other or multiple layers. The matrix can be attached to the sheets either parallel to the sheet axis or on an angle of 45°, but other orientations are possible depending on the application. In all cases, a provision is made so that the panels interconnect structurally.

For the matrix of elongated members, the elongated members may be indented preferably between ¼" and ⅜" and more preferably between ⅜" and ½" on two contiguous sides, while the other two sides would be extended by between preferably ¼" and ⅝" and more preferably between ⅜" and ½" with an end member. Additionally, the length of the elongated members could be between ¼" and ¾" longer than the sheet on two contiguous sides to machine a tongue and groove attachment.

In all embodiments, the spacing structural elements can protrude on two contiguous edges and may be chamfered to enhance interlocking with adjacent panels. The spacing structural elements would be similarly indented on the two opposite contiguous edges. The extension would normally be no more than 1 inch and would ideally be between ½" to ⅜".

Additionally, the one or both sheets can be manufactured from plastic materials. These plastic sheeted panels could be used for waterproof applications such as for roofing or basement wall applications, with one or both sheets providing a barrier to liquid water and/or water vapor. The joints would be waterproofed with an application of waterproof mastic or tape. The panels could be combined with a multitude of construction materials and methods in the same way conventional sheathing is used today. Further, a top sheet of one panel may be extended in length and attached such that it overlaps a top sheet of an abutting lower adjacent panel by approximately two to four inches.

The panels could also be manufactured with a perforated bottom sheet to facilitate ventilation into the panel matrix. The perforations would ideally be round in shape, sized ¼" to 1" in diameter, and arranged in a matrix that is ideally staggered from the adjacent holes with a spacing of 4 to 12 diameters in widths. A layer of screening (e.g., fiberglass, aluminum, plastic) could be affixed along the interior or exterior surface of the perforated sheet. The perforations allow for the exhausting of heat, gases, and moisture in attics and non-living spaces. The holes should be such that the panel can still transfer necessary tensile and compressive forces. Both solid and perforated panels can be used together in building assembly, such as a roof.

The panels can facilitate the use of a wide variety of insulation possibilities without requiring special consideration for ventilation since the ventilation is integral with the panels. This is useful for common fiberglass as well as blown products such as fiberglass, Rockwool, cellulose and other products. This is especially useful for the new high performance spray foam expanding insulations that are becoming popular because of their high energy efficient performance and ability to seal infiltration.

The panels can be used in both residential and commercial construction. The panels can be used both for on site installation and for factory built modular homes. The panels would be useful for manufactured homes and trailers.

To facilitate construction, the exterior of one or both sheets could be marked with exterior lines showing the location of the interior elongated members. The exterior facing sheet could also be of waterproof construction and made of waterproof material, such as some form of plastic, providing for the exposed layer of roofing or wall covering. The top sheet could be sized larger than the bottom sheet such that a top sheet of a first panel would extend to overlap a top sheet of an adjacent, and preferably vertically lower, panel.

In addition to wall and roof sheathing, a flooring system of the ventilated structural panels as described would have many benefits. Increased structural strength, spanning capability and reduced deflection, all of which would result in less materials needed for supports (joists or trusses or composite joists) and better performance in terms of strength and stiffness. A properly engineered panel could be used for flooring providing a plenum for air distribution providing warmed and cooled air to be distributed within the floor. The warmed air would be a desirable characteristic in bathrooms.

A properly engineered panel could be used for flooring providing a plenum for electrical distribution where wires and data communication cables could be easily run. A properly engineered panel could be used for flooring to provide a plenum for radiant heat or forced hot air heat. In this case, one interior surface would generally receive a layer of reflecting material and the spacers would have to be mechanically connected. A properly engineered panel could be used for flooring providing a plenum for plumbing distribution where pipes, tubes and conduits of proper size could be run. Finally, a flooring system with this panel construction is naturally quieter than one sheet of sheathing, providing a nose buffer. This noise buffering benefit would also apply to walls and roofing.

This panel offers three main simultaneous advantages of ventilation, ease of use, and significantly increased strength. First, these panels offer ventilation both through the panel sheets and between the panel sheets. In this way, the panels may remove moisture and gasses passing through an interior facing sheet, and exhaust them via the continuous air channel created between the sheets by the spacing structural elements. This air channel will be approximately the width and height of the combined width and height of any contiguous surface formed by the ventilated structural panels being attached contiguous with one another. Such a large air channel can provide for dramatically increased air flow over the interior facing sheet, and thus dramatically increased ventilation between the interior and exterior—even if only passively. A particular advantage this offers is for roofing situations in colder climates to assist in avoiding ice dams.

A ventilated structural paneled roof provides for ventilation of moisture and gasses from the house, and allows a flow of cold air along the entire roof surface, in the interior of the panels, to prevent the formation of ice dams. A ventilated structural paneled roof allows for the entire roof to remain cold in the winter, preventing snow from melting and ice dams from forming. Any heat that migrates into the ventilation plenum is exhausted to the outdoors and does not melt the snow on the roof. Similarly, ventilation of a wall surface provides the same benefits noted above. Ventilation in warm climates or during warm months can exhaust hot air from the attic space, extending the life of roofing materials and reducing cooling costs. Also, the inventive panels can typically achieve ventilation of at least ⅟₅₀, when compared to free, unobstructed end area, greatly exceeding many code requirements.

Second, the structural connection between the two sheets of material interconnected with spacing structural elements with adhesive and or mechanical means to transfer shear forces provides that the entire entity becomes a synergistic structural panel with characteristics that exceed the strength of the individual parts. The top and bottom sheets act like the flanges on a beam or truss and provide better load carrying strength, increased span capability and less deflection than the individual sheets together. Preliminary tests indicate that an assembly of two ¼ inch sheets of plywood spaced with ⅝ inch blocks is 4 times stronger than just one sheet of ½ inch plywood alone, and two ¼ inch sheets of plywood spaced with a matrix of two ¾" by ¾" members can be 10 times stronger than just one sheet of ½ inch plywood alone.

This extra strength can be used advantageously to increase the load capacity or the length of the unsupported span of the panel, which reduces the required number of underlying supporting rafters, studs, joists, trusses or purloins, and thus cost of building.

The spacing structural elements material, size, arrangement, thickness, shape and orientation can vary with the application and be adapted to the specific need of the application.

The plurality spacing structural elements may be arranged such that a number of linear pathways are created. Each pathway's dimensions are limited by the dimensions and arrangements of the spacing structural elements. Utilizing blocks, the pathways may measure in height the full distance separating the first and the second sheet; the width measurement is dependent on how far apart the blocks are spaced from one another. Utilizing two layers of elongated members, the height of the pathways will measure approximately one half of the distance that separates the two sheets. Like the blocks, the width of the pathways formed with elongated members will be equal to the distance separating two neighboring elongated members in the same layer. When the two layers of elongated members are arranged perpendicular to each other, the pathways will also be orthogonal. Each pathway allows air to move along each pathway unobstructed from at least one edge of the panel to at least one opposite edge of the panel.

The spacing structural elements can protrude on two contiguous sides with chamfered edges. The extent of the protrusion could be matched by an indention of the spacing structural elements on the opposite contiguous two edges which would provide for interlocking of panels. This interlocking of panels would provide structural continuity, increasing structural integrity and minimizing discontinuous deflection and buckling.

Third, the panel offers significant advantages as to ease of use. Since the panel is assembled from readily available building materials, it is familiar to the designers, suppliers and trades in terms of size and weight. It can be cut, sized and attached in the same manner of conventional sheathing. No special tools or skills are needed. No special orientation is needed to ensure the continuity of ventilation, except that the interlocks should be maintained for increased structural integrity. Ventilation is maintained without any special considerations or the use of any special additional materials, except insect and moisture blocking at the exposed edges.

In another embodiment, the panels can also be constructed as two sheets separated by a single layer matrix as described in paragraph 28. The matrix members can consist of wood, plywood, OSB, medium-density fiberboard (MDF), other wood composites, plastic or other materials and shaped in a rectangular or most likely square profile and extending either the length in the longitudinal direction or the width in the perpendicular direction. Said matrix can be extended on two contiguous edges and chamfered and indented on the opposite two edges to facilitate interlocking as previously described.

The members would be placed parallel to each other and fastened to both the top and bottom panels with adhesives and/or mechanical means. The spacing between members would be from 2 times the thickness an individual matrix member to 16 times the thickness, but ideally from 4 times to 12 times.

The single layer panels could also have perforations as previously described. The perforations would ideally be round but could also be other shapes such as oblong, oval, square or rectangular or a combination of geometric shapes such as square with rounded corners.

The single layer panels would be useful for wall sheathing applications where the strength of the perpendicular matrix may not be as important or for some flooring applications. The panels may be used for decorating concrete formwork. The orientation of the single layer matrix may be either longitudinal, lateral, or diagonal depending on the specific application.

In an additional embodiment, the panel may be comprised of simply one sheet of panel with a matrix of members, without a second sheet. It could be constructed of plywood, OSB, MDF or other materials such as plastic or other composite wood material. In a further additional embodiment, the matrix of structural spacing elements can also be manufactured integrally with the panels in either OSB or Plywood or other materials such as MDF, plastics or other wood composites.

Manufacturing integral structural spacing elements, including the matrix of elongated members, would eliminate the need to separately attach the elongated members to each sheet.

Integral raised members would serve as the matrix of elongated members. Two similar sheets may have integral elongated members formed longitudinally in a first sheet and laterally in a second sheet. The two sheets would then be joined together by adhesives and/or mechanical means, with the matrix members in contact with one another. The finished flat panel surface would be exposed on the top and bottom. An alternative arrangement would provide for the integral raised members to be formed at angles to the edges of each respective sheet. Preferably the integral raised members on the first sheet would be formed such that, when they are mated with the integral raised members on the second sheet, the integral raised members of the first sheet will be perpendicular to the integral raised members of the second sheet.

The same characteristics regarding the size, shape and spacing, and ranges therein, of the individual integral elongated members would be as the elongated members previously described.

In producing panels utilizing integral raised elongated members, plywood sheets, for example, could be manufactured with a plurality of raised ridges or strips. The raised ridges or strips would function as the integral elongated members. Two sheets would then be attached to each other with adhesives and/or mechanical means via the plurality of integral elongated members, preferably with the integral elongated members of each sheet in perpendicular orientation to the other respective sheet. These panels could also be manufactured from OSB, medium density fiberboard, or other wood composite materials or plastics. These panels and the sheets and integral elongated members could be manufactured in multiple steps, or in a single step. The integral members could be added during the panel production, or material could be removed after production to leave the plurality of elongated members, or the sheet and members could be formed substantially simultaneously, including with a mold.

The integral raised elongated members could be made during the panel manufacturing process with special tools, equipment, rollers, molds and other such means as necessary. The shape of the integral raised member could take many shapes depending on the tooling, rollers, presses, machinery and other factors, including flat or round tops, sharp or rounded edges, and flattened or rounded sides. They could have rounded chamfered corners with or without a flat top, they could have angled chamfered corners, they could be rectangular or square in shape.

The integral raised members could be either manufactured simultaneously with the sheets or could be shaped by removing material after manufacturing a sheet of extra thickness, to accommodate the finished thickness and integral raised member. Applications of the panels utilizing integral structural spacing elements would include roofing, flooring, and siding for residential and commercial construction.

The panels with integral matrices' could be manufactured out of Plywood, OSB, MDF or other similar material, including plastics.

The panels with integral matrices' could also have perforations as previously described. The perforations would ideally be round but could also be other shapes such as oblong, oval, square or rectangular or a combination of geometric shapes such as square with rounded corners.

A further embodiment utilizing integral structural spacing elements would utilize the first sheet utilizing structural spacing elements, and a second sheet without integral structural spacing elements. In this embodiment non-integral structural spacing elements can also be used to attach the second sheet to the integral structural spacing elements of the first sheet to the second sheet.

A still further embodiment utilizing integral structural spacing elements would utilize both the first and the second sheet, each with integral structural spacing elements, being connected to one another via non-integral structural spacing elements.

Yet another embodiment utilizing integral structural spacing elements involves manufacturing the panel such at that the location where the integral members of the first sheet contact the integral members of the second sheet, there is provided that at least one first integral member of the first sheet may enter into a recess of at least one second integral member of the second sheet. The recess in the at least one second integral member functioning as a notch for the at least one first integral member to be received into. The at least one first and at least one second integral member could also be adhesively and/or mechanically joined. Additionally the least one first integral member may also be provided with a recess in which the at least one second integral member may enter. It is envisioned that the notched recesses may be provided only on the integrated members of one sheet, could be provided on the integrated members on both sheets. The notches could be provided uniformly on every elongated member one or both sheets, or could be staggeredly provided at alternating locations and/or on alternating integrated members on one or both sheets. It is also envisioned that this notch/recess arrangement could similarly be employed with non-integrated member embodiments.

This notch like interface between members of multiple layers of members may also be utilized for panels including non-integral structural spacing elements, such as those discussed above.

It should be noted, that the edges of the sheets on any panels in this application may be shaped with tongues on two contiguous edges and corresponding groves on the remaining two contiguous edges for interlocking of multiple panels, and/or interlocked with the indented and overlapped spacing structural elements arrangement described in paragraphs above.

It should also be noted a number of different arrangements are contemplated in which spacing structural elements create unobstructed pathways for air to move through the panel, from at least one edge of the panel to at least one of an opposite and an adjacent edge of the panel. The height of the unobstructed pathways will normally be equal to the height of the members. The width of the pathways will normally be equal to the spacing between adjacent members of a common layer. The number of parallel unobstructed pathways created in the panel for air to move in any one direction will preferably range from between 1 and 30, more preferably between 2 and 25, even more preferably between 4 and 20, yet even more preferably between 5 and 19, and most preferably between 6 and 12. If the elongated members were spaced at approximately 16 inches on center, the pathways could be approximately 15 inches in width. Similarly, if the elongated members were spaced at approximately 24 inches on center, the pathways could be approximately 23 inches in width. In such a way it is achievable to have at least between two to three unobstructed pathways in a first direction, and between four and six unobstructed pathways in a second, preferably perpendicular direction, each measuring approximately ¾" in height and 15" to 23" in width. It is also achievable to have at least between four and ten unobstructed pathways in a first direction, and between eight and twenty unobstructed pathways in a second, preferably perpendicular direction, each measuring approximately ¾" in height and 4" to 12" in width.

It should also be noted that the structural spacing elements, and in particular the elongated members, can be formed in specialized shapes to convey additional qualities to the structural spacing elements, and thus the panels. Some specialized shapes include non-perforated and perforated I-beam, truss, skip truss, honeycomb, and corrugated shaped engineered matrix members.

It should further be noted that the invention will preferably be configured in one of the four ways following ways. First, a panel could be configured as a single sheet with a single layer of elongated members attached to the sheet, the elongated members arranged parallel with one another, and parallel with one axis of the panel and perpendicular to the other axis. That is, the elongate members could be arranged parallel to a long axis or a short axis of the sheet. In a second panel configuration, a single layer of members, as described in the first alternative, may be arranged between and connected to two sheets. Third, a panel could be configured as at least a double layer of elongate members attached to a single sheet, with each layer of elongate members arranged perpendicular to each adjacent layer of elongate members, at least one layer arranged parallel to one of a long or a short axis of the single sheet, and the elongate members being attached to one another where the multiple layers of elongate members intersect. Fourth, an at least double layer of elongate members, as described in the third alternative, may be arranged between and connected to two sheets.

To reiterate, the panels, and their constituent sheets and structural spacing elements, can be constructed or made from porous or non-porous wood, cellulose or other organic material, composite, ferrous, metallic, plastic, or any other material that can be shaped into a flat sheets and/or the structural spacing elements. The top and bottom sheets and the structural spacing elements can each be of different materials and thicknesses. The top sheet can be waterproof and the bottom sheet can be perforated to facilitate ventilation.

It should further also be noted that the panel typically has an empty volume of approximately 70%, but can range from 40% to 90%, or preferably from 50% to 80%, or more preferably from 65% to 75%, depending on sheet thickness and structural spacing element size, shape, and placement.

The panels may have a clear, unobstructed airflow of approximately 30% of the area of the end of any panel assembly, but can range from 10% to 60%, or preferably from 20% to 50%, or more preferably from 25% to 40%. With the use of special engineered matrix members, discussed in further detail below, the clear, unobstructed airflow can be up to around 75%, but can range from 65% to 85%, or more preferably from 70% to 80% of the end area of the panel assembly.

The clear unobstructed airflow on a panel with solid matrix members of a range from approximately 1/50 to 1/70 when comparing free, unobstructed end area with panel coverage. This depends on roof slope, matrix member size and spacing. Some building codes require ventilation of 1/300, and some codes are contemplating requiring or recommending ventilation of 1/150. The inventive panels could provide 6 to 12 times greater ventilation performance.

Further description will be provided with reference to the Figures below.

BRIEF DESCRIPTION OF THE DRAWINGS

FIG. 16 is an iso view of a roof arrangement constructed using perforated and non-perforated panels;

FIGS. 20A and 20 B are iso-views of panels with a single layer of spacing structural elements, each having a portion of the top sheet cutaway to show detail;

FIGS. 26A-26D are profile views of multiple examples of potential profiles of integrated elongated members.

DETAILED DESCRIPTION OF THE DRAWINGS

Figure 1:
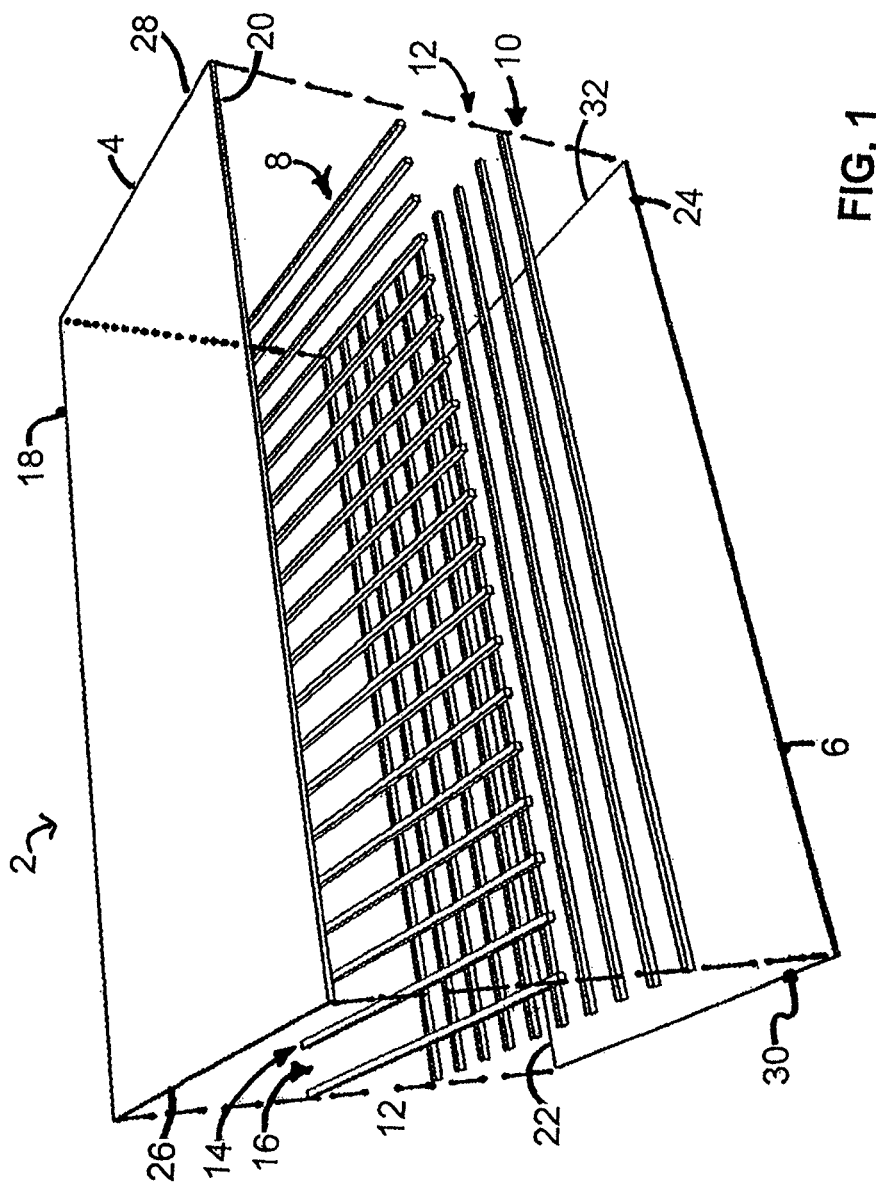
FIG. 1 is an exploded depiction of an embodiment of the panel.
Figure 2:
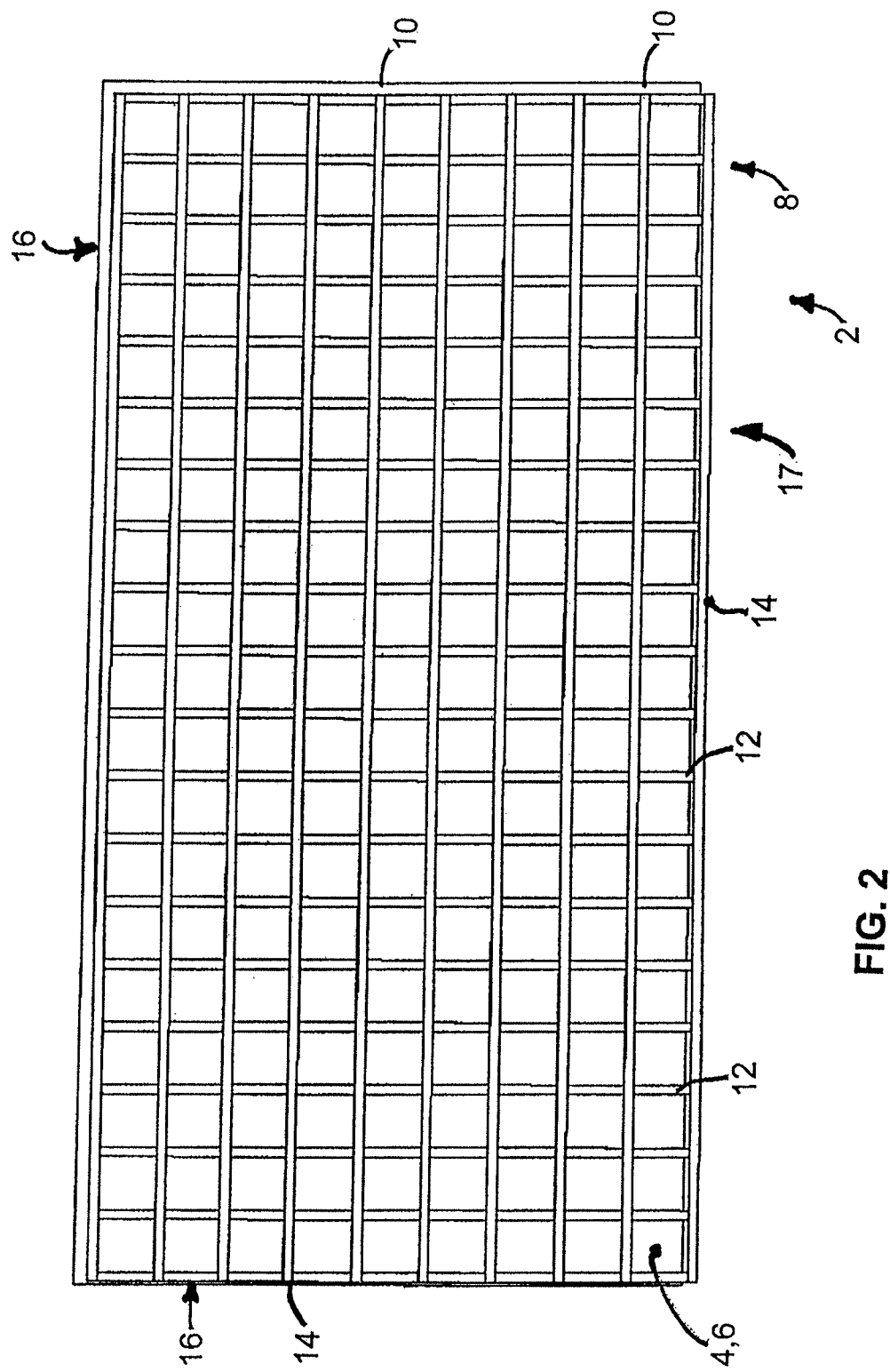
FIG. 2 is plan view of an embodiment of the panel.

As seen in FIGS. 1 and 2, the panel 2 is comprised of a first sheet 4 and a second sheet 6 fixedly mated together via spacing structural elements 8. In one embodiment the spacing structural elements 8 are comprised of a first layer 10 and a second layer 12 of rectangular shaped elongated members 14, spaced apart from each other a predetermined spacing distance 16. The arrangement of elongated members 14 in the first layer 10 is perpendicular to the arrangement of elongated members 14 in the second layer 12, forming a matrix 17 of elongated members 14.

As shown in FIG. 1, a first horizontal edge 18 and a second horizontal edge 20 of the first sheet 4 substantially align with a first horizontal edge 22 and a second horizontal edge 24 of the second sheet 6, respectfully. Similarly, a first vertical edge 26 and a second vertical edge 28 of the first sheet substantially align with a first vertical edge 30 and a second vertical edge 32 of the second sheet 6, respectfully. For sake of clarity, the second sheet 6, though present each embodiment depicted, is not shown in FIGS. 2, 3 and 6-10 below.

Figure 3:
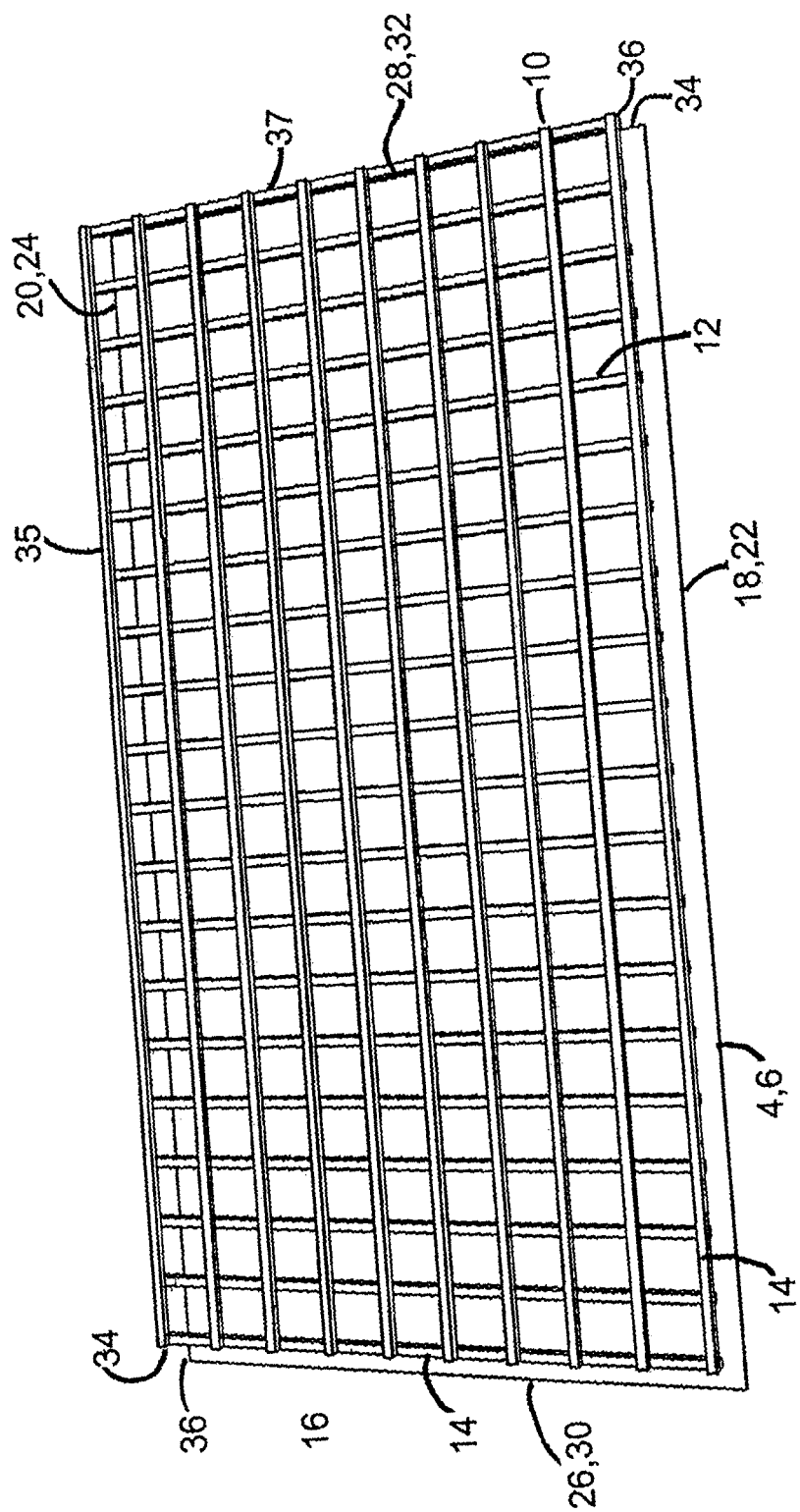
FIG. 3 is a plan view of an embodiment of the panel depicting the indented space and protruding segments.

As shown in FIG. 3, the first 10 and the second layer 12 of elongated members 14 are indented a certain first distance 34 inward from the first horizontal edges 18, 22 of the first and the second sheet 4, 6. The first 10 and the second layer 12 of elongated members 14 correspondingly overlap the second horizontal edges 20, 24 of the first and the second sheet 4, 6 by the same first distance 34, creating first protruding segments 35. Similarly, the first 10 and the second layer 12 of elongated members 14 are indented a certain second distance 36 inward from the first vertical edges 26, 30 of the first and the second sheet 4, 6. Likewise, the first 10 and the second layer 12 of elongated members 14 correspondingly overlap the second vertical edges 28, 32 of the first and the second sheet 4, 6 by the same second distance 36, creating second protruding segments 37.

These matching indents and overlaps aid in fittingly mating a first panel 2 to a neighboring second panel 2 in a secure "tongue in grove" fashion. By providing corresponding indent and overlap on all four edges, a surface formed of multiple panels may be assembled faster, have increased strength and rigidity as a unit, and helps ensure a continued smooth panel surface. As in the embodiment shown, the first distance 34 of indent and overlap with respect to the horizontal edges can be of the same value as the second distance 36 of indent and overlap in the horizontal direction. It is to be noted that the indent and overlap have been exaggerated in FIG. 3, to show detail.

Figure 4:
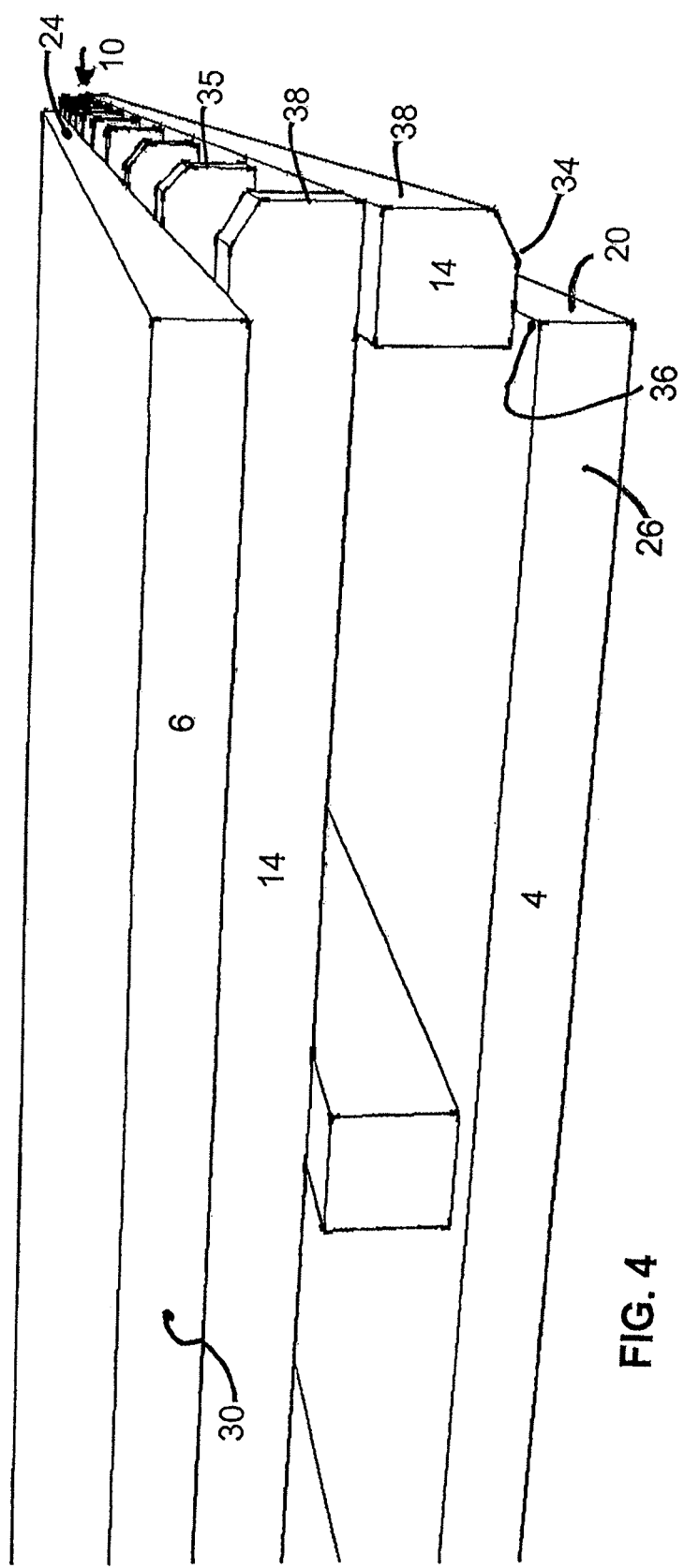
FIG. 4 is a close-up iso view of an embodiment of the panel, depicting the indented space, protruding segments, and chamfered edges.

As shown in FIG. 4, a portion of the first protruding segments 35 that overlap the second horizontal edges 20, 24 of the first and the second sheet 4, 6, have a chamfered edge 38. These chamfered edges facilitate inserting the first protruding segments 35 of the first 10 and the second layer 12 of a first panel 2 into a second adjacent panel 2, and specifically into a space provided by the inward indent of the elongated members 14 the first distance 34 from first horizontal edges 18, 22 of the first 10 and the second layer 12 of the adjacent panel. The chamfer on the chamfered edge 38 would terminate between 1/8" and 3/8" from the second horizontal edges 20, 24 of the first and the second sheet 4, 6, and preferably would terminate approximately 1/4" from the second horizontal edges 20, 24 of the first and the second sheet 4, 6.

In a like manner a portion of the second protruding segments 37 that overlap the second vertical edges 28, 32 of the first and the second sheet 4, 6, have a chamfered edge 38 [not shown]. These chamfered edges similarly facilitate inserting the second protruding segments 37 of the first 10 and the second layer 12 of a first panel 2 into a second adjacent panel 2, and specifically into the space provided by the inward indent of the elongated members 14 the second distance 36 from the first vertical edges 26, 30 of the first 10 and the second layer 12 of the adjacent panel. The chamfer on the chamfered edge 38 would terminate between 1/8" and 3/8" from the second vertical edges 28, 32 of the first and the second sheet 4, 6, and preferably would terminate approximately 1/4" from the second vertical edges 28, 32 of the first and the second sheet 4, 6.

Figure 5:
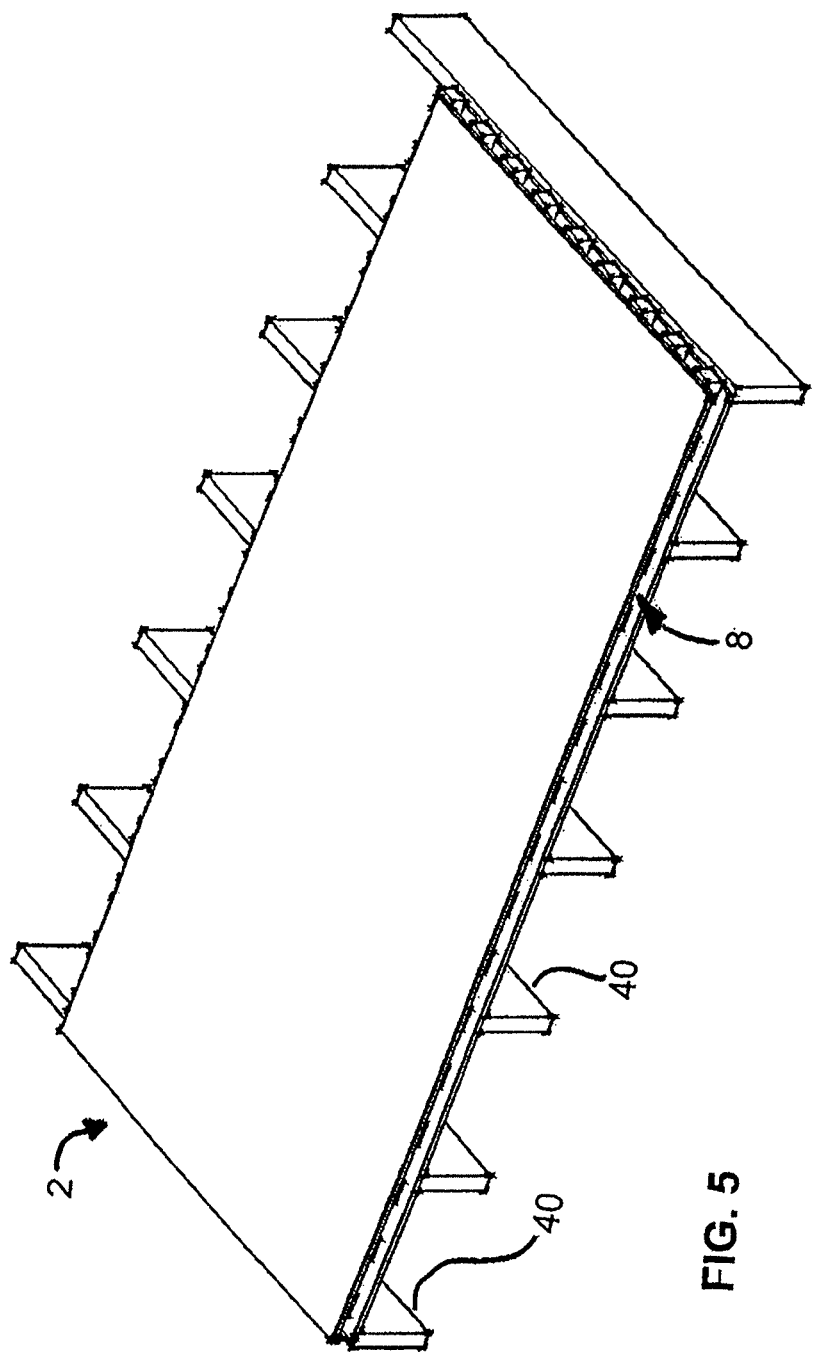
FIG. 5 is an iso view of the panel mounted on mounting elements.

As shown in FIG. 5, the panel 2 may be mounted onto mounting elements 40 such as roofing rafters or trusses, flooring joists, or wall studs, just as normal plywood or OSB board would be mounted—twelve inches on center. Because of the panels' increased strength, they may be mounted to mounting elements 40 spaced father apart than a plywood or OSB board of the same thickness as the sum of the thickness of the first and second sheet of the panel would require under similar conditions—including allowing the panels to be mounted on mounting elements 40 spaced sixteen, twenty four, thirty six, forty two, forty eight, and ninety six inches apart on center.

Figure 6:
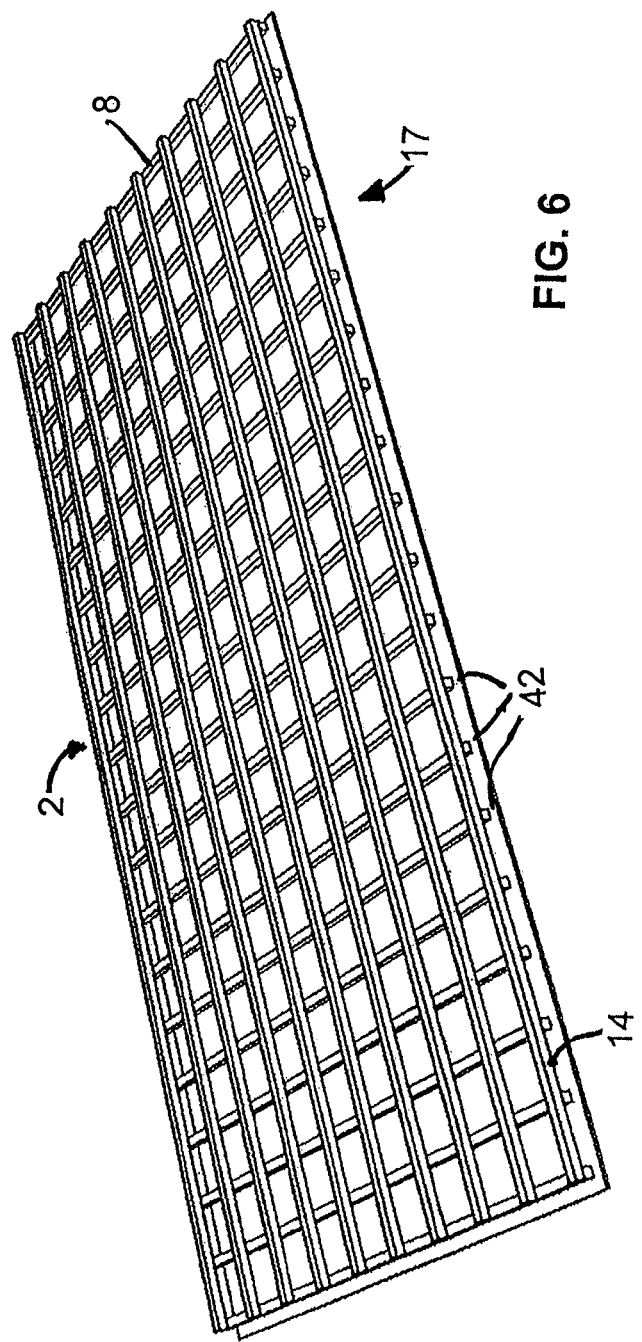
FIG. 6 is an iso view of an embodiment of the panel utilizing plywood veneer as spacing structural elements, without showing the top sheet.

Turning to FIG. 6, a plurality of plywood veneer strips 42 may also function as the elongated members 14. In such an embodiment, each elongated structural element 14 may be made up of a plurality of plywood veneer strips 42, ranging from two to ten 1/8 inch plywood veneer strips 42 per elongated structural element 14, and preferably six 1/8 inch plywood veneer strips 42 per elongated structural element 14.

Figure 7:
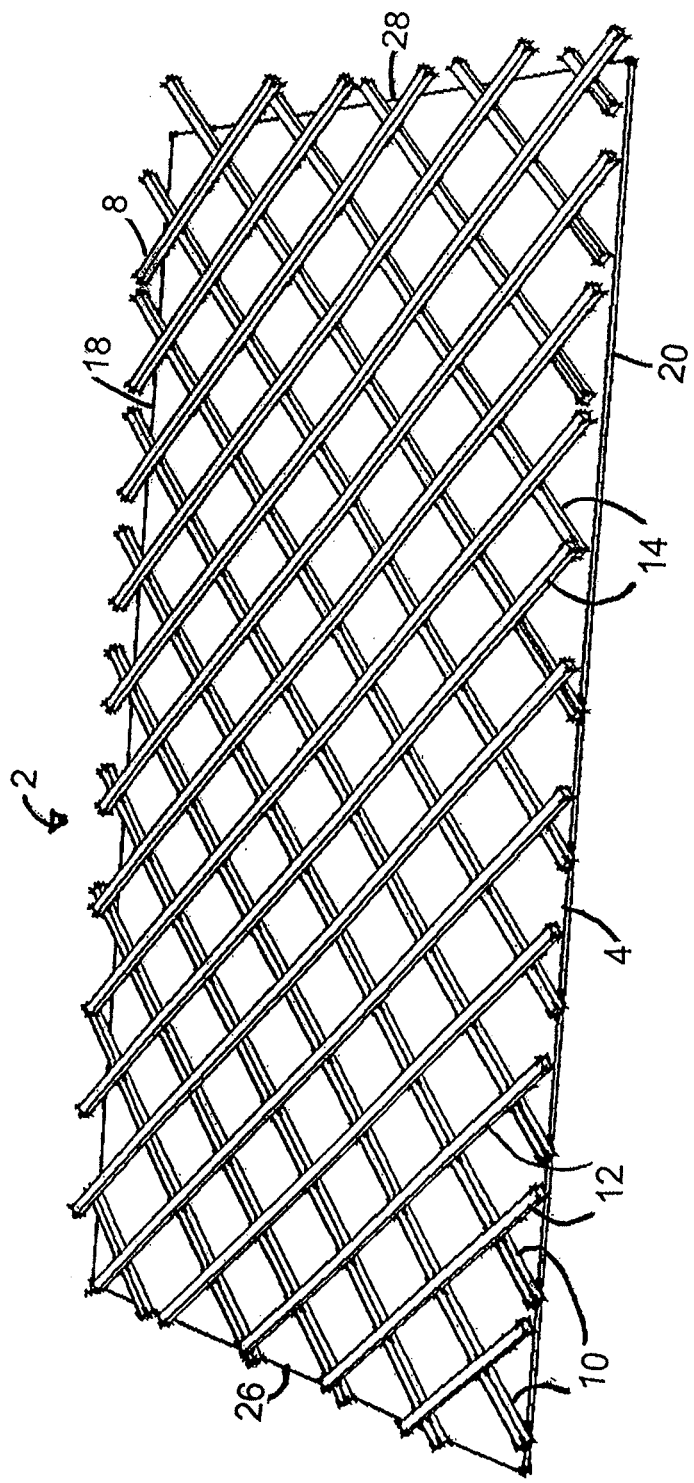
FIG. 7 is an iso view of an embodiment of the panel where the spacing structural elements are aligned diagonally, without showing the top sheet.

As shown in FIG. 7, the matrix 17 of elongated members 14 may be arranged diagonally with respect to the horizontal 18, 20, 22, 24 and vertical 26, 28, 30, 32 edges of the first and the second sheet 4, 6. In this embodiment, the elongated members 14 of the first layer 10 may be arranged at an angle of between 30° and 60° with respect to the first horizontal edge 18 of the first sheet 4, and preferably at an angle of 45° with respect to the first horizontal edge 18 of the first sheet 4. The elongated members 14 of the second layer 12 may also be arranged at an angle of between 30° and 60° with respect to the first horizontal edge 18 of the first sheet 4, and preferably at an angle of 45° with respect to the first horizontal edge 18 of the first sheet 4.

Figure 8:
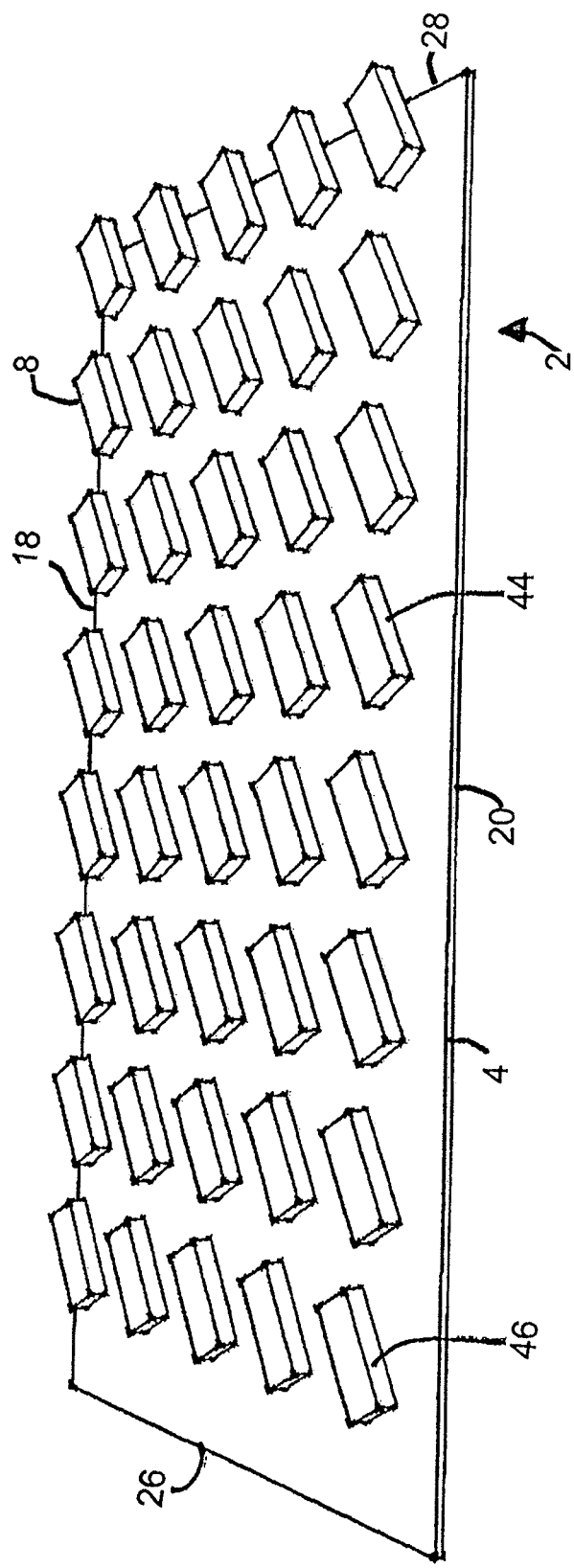
FIG. 8 is an iso view of an embodiment of the panel utilizing rectangular blocks as spacing structural elements, without showing the top sheet.
Figure 9:
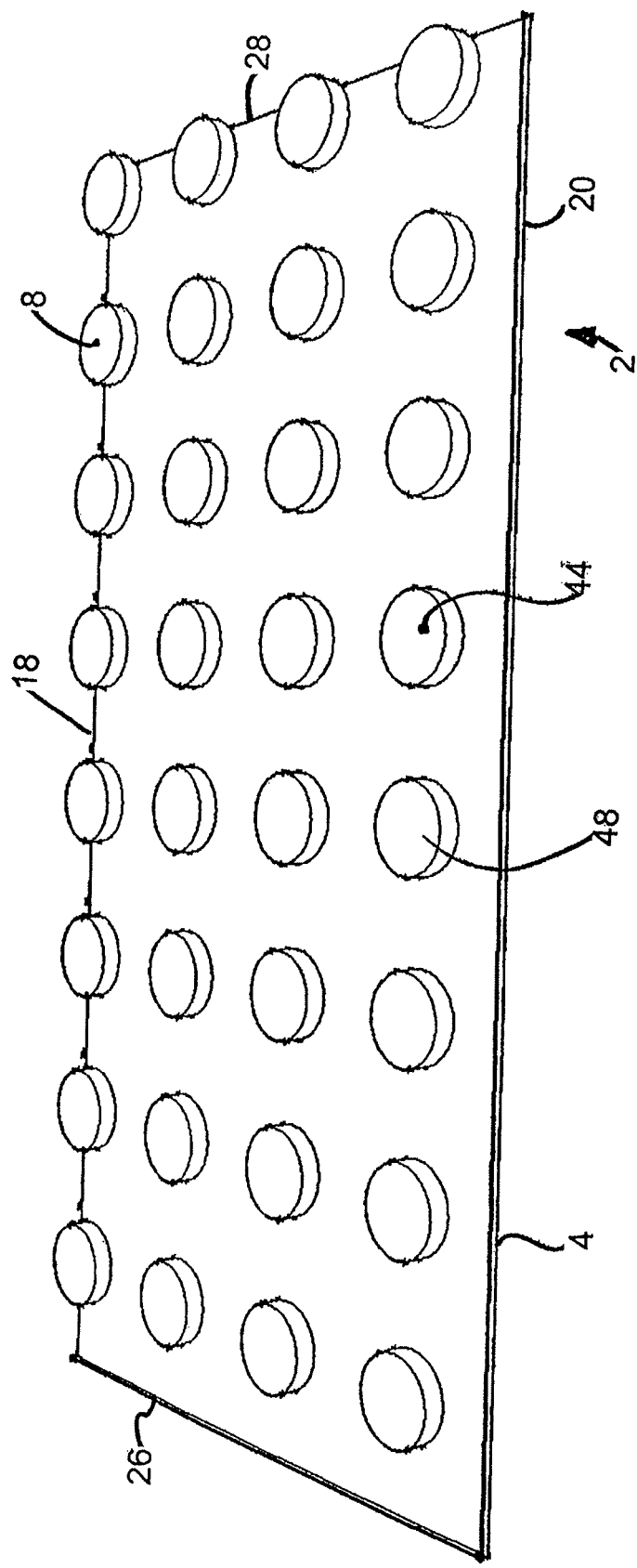
FIG. 9 is an iso view of an embodiment of the panel utilizing circular blocks as spacing structural elements, without showing the top sheet.
Figure 10:
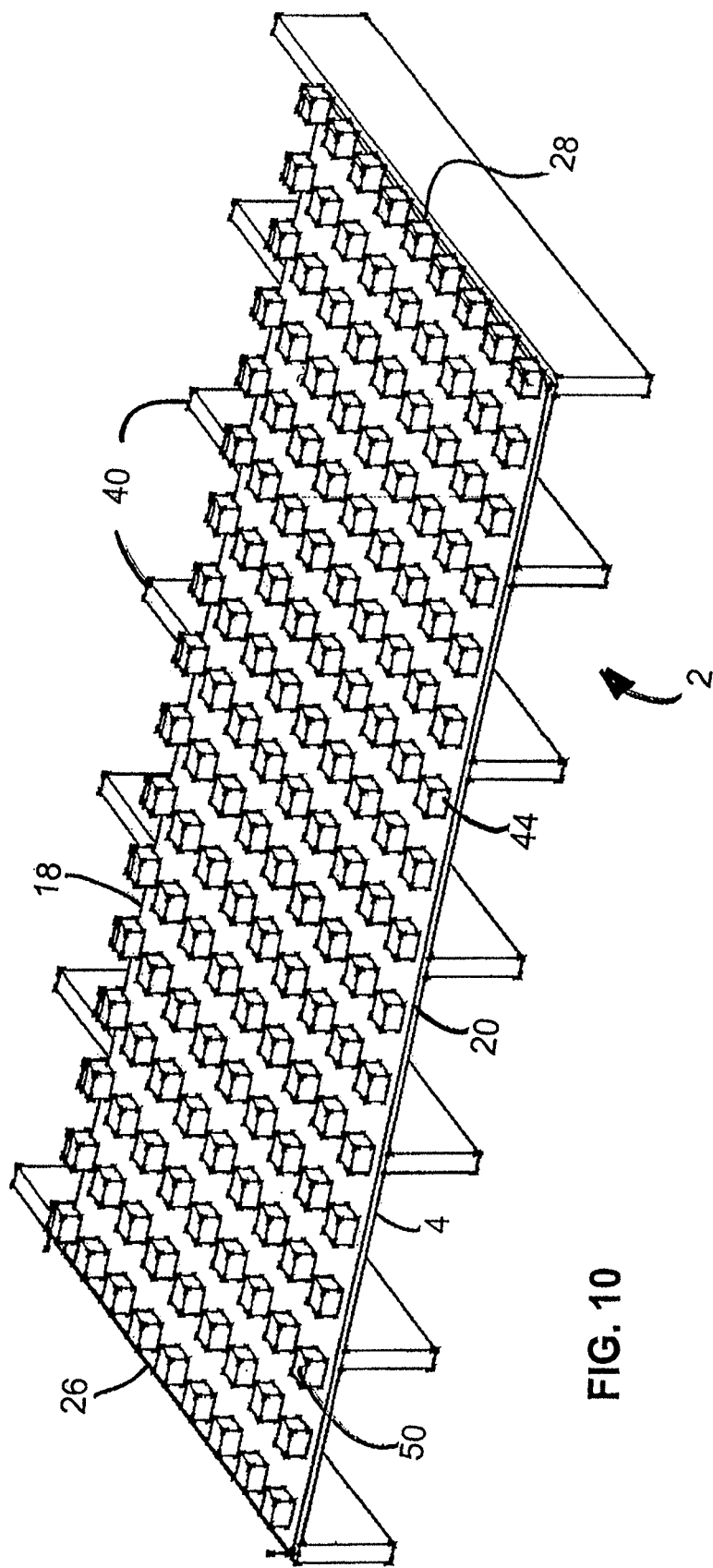
FIG. 10 is an iso view of an embodiment of the panel utilizing square blocks as spacing structural elements, without showing the top sheet.

As shown in FIGS. 8 through 10, the spacing structural elements 8 may also be comprised of blocks 44 being preferably rectangular 46, circular 48, or square 50 in shape. Though according to tests, panels 2 utilizing blocks 44 as the spacing structural elements 8 increased the strength of a comparable plywood board by only half as much as panels 2 utilizing elongated members 14 as the spacing structural elements 8, panels utilizing blocks 44 as the spacing structural elements 8 offer an increased assortment of paths that a pipe, tube, wire, or other insert 52 may be run through the panel 2, especially if the insert has dimensions approaching one half the spacing between the first and second sheet 4,6.

As shown in FIGS. 8 and 9 the blocks 44 would also preferably be indented a first and second distance 34, 36, and similarly have first and second protruding segments 35, 37, correspondingly overlapping their respective edges the same first and second distances 34, 36.

As shown in FIG. 8, the blocks 44 could also be aligned diagonally with respect to the horizontal 18, 20, 22, 24 and vertical 26, 28, 30, 32 edges of the first and the second sheet 4, 6. In this embodiment, the blocks 44 may be arranged at an angle of between 30° and 60° with respect to the first horizontal edge 18 of the first sheet 4, and preferably at an angle of 45° with respect to the first horizontal edge 18 of the first sheet 4.

Figure 11:
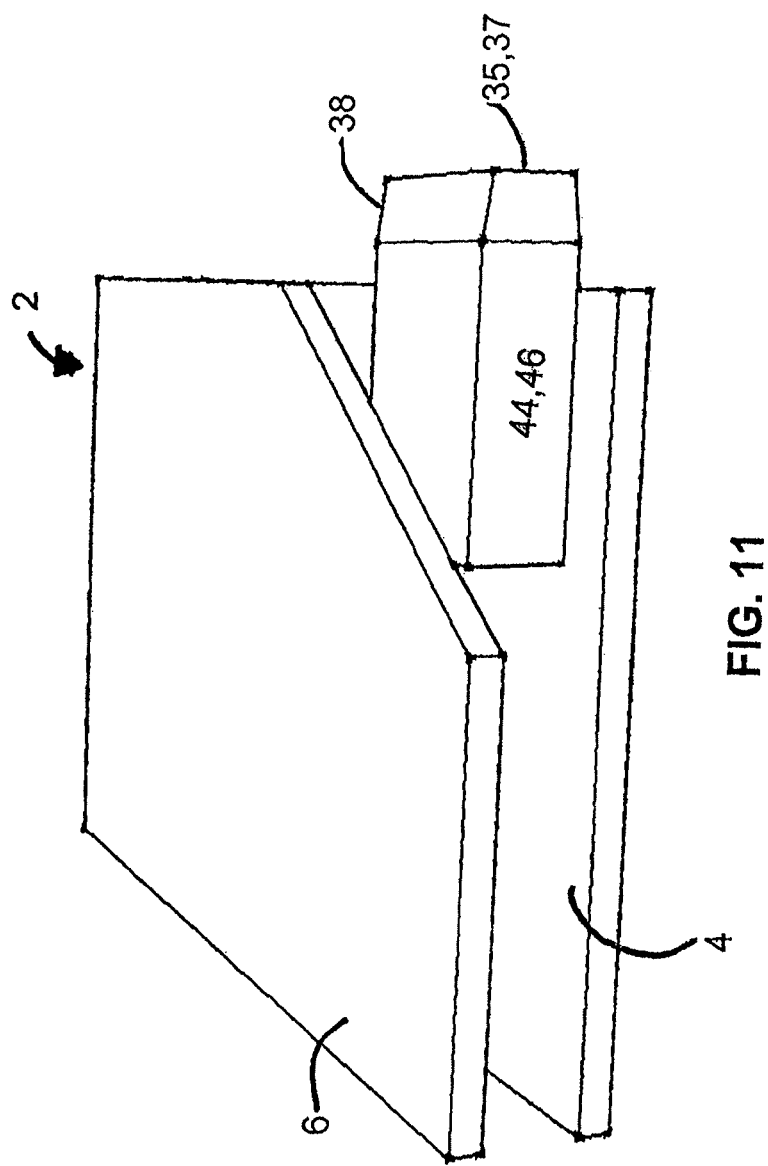
FIG. 11 is a close-up iso view of an embodiment of the panel, depicting the indented space, protruding segments, and chamfered edges.

As shown in FIG. 11, the protruding segments 35, 37 of the blocks 44 would similarly be provided with a chamfered edge 38, to assist in inserting the protruding segments 35, 37 of the blocks of a first panel 2 into the space provided by the blocks 44 of an adjacent second panel 2 indented at least as much as the distance the protruding segments 35, 37 protrude past the edge of the first and the second sheet 4, 6.

Figure 12:
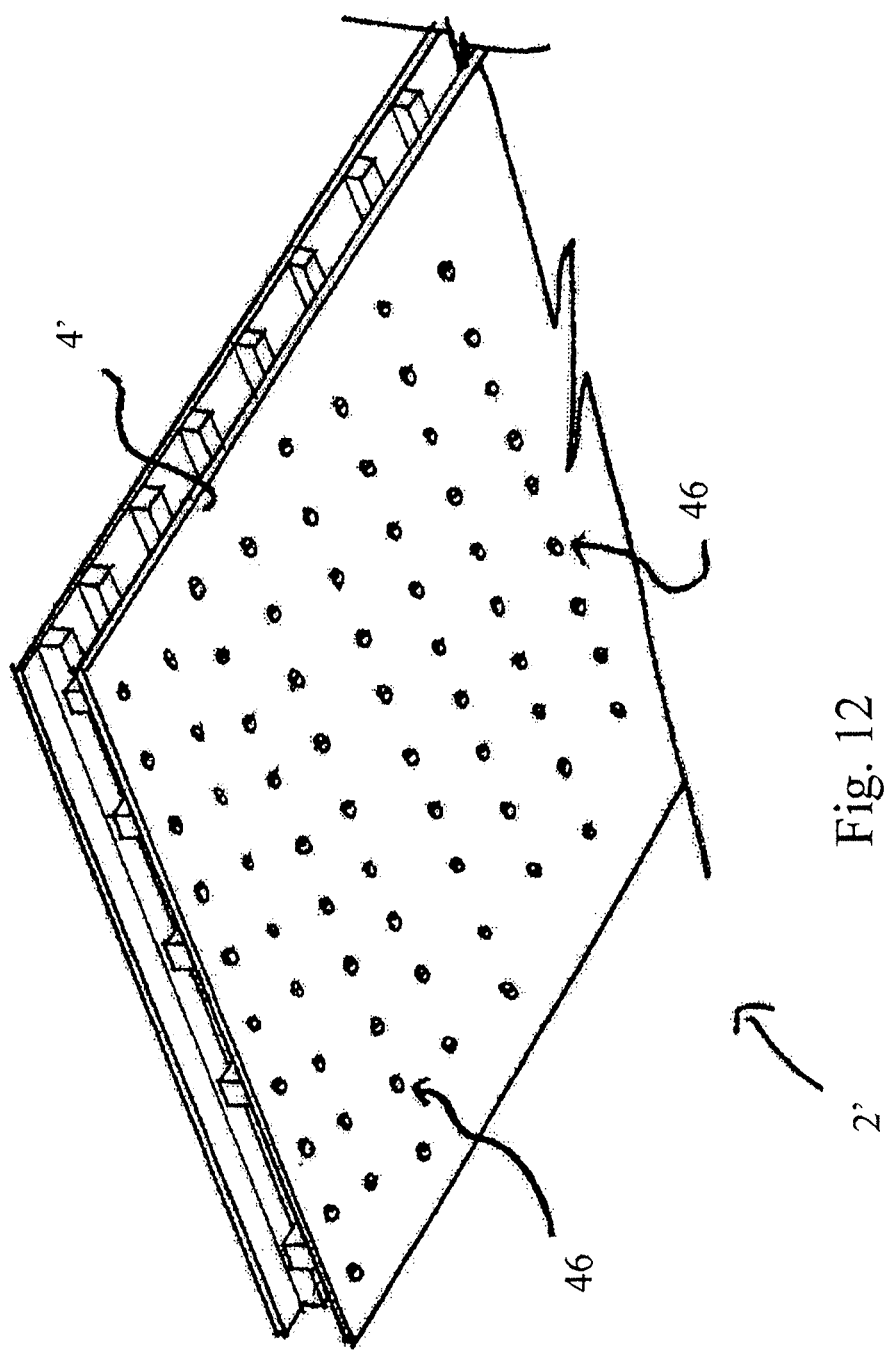
FIG. 12 is an iso view of an embodiment of the panel with perforations in one sheet, viewed from the underside.

Turning to FIG. 12, a perforated panel 2' with a perforated first sheet 4' is shown. The perforations 46 are arranged in a matrix type arrangement and facilitate the passage of air from the outside of the perforated panel 2', through the perforated first sheet 4', via the plurality of perforations 46 into the interior of the perforated panel 2'. The perforations 46 are through holes of between 1/16 inches and 1/2 inches in diameter, and preferably between 1/4 inches and 1 inch in diameter, and most preferably between 3/8 inches and 5/8 inches in diameter. The matrix arrangement may be staggered, with each hole spaced between 4 and 12 diameters from adjacent holes. Additionally, a layer of screening 80 (not shown) may be attached to the inner surface of the perforated first sheet 4'. The perforated panel 2' is constructed in a similar manner to the non-perforated panel 2, with the exception of perforating or using a perforated first sheet 4', and the perforated panel 2' may be used in the same manner as the non-perforated panel 2.

Figure 13A:
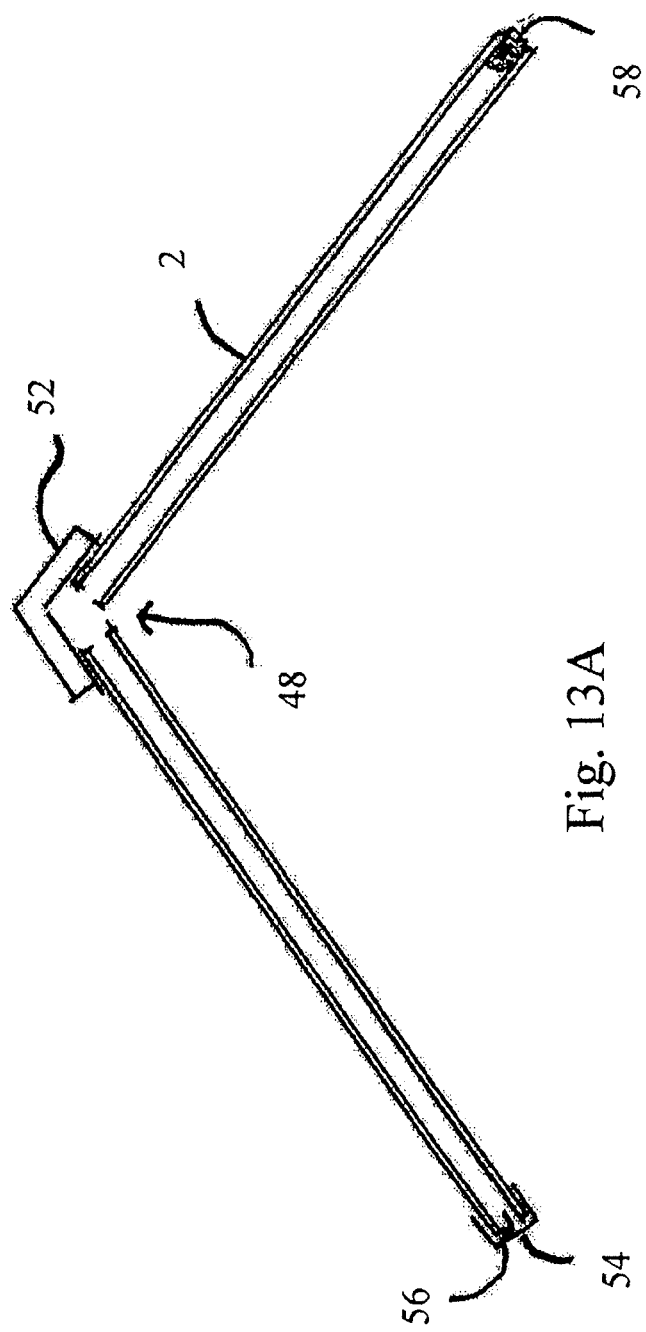
FIGS. 13A and 13B are side views of two roof arrangements constructed with the panels.
Figure 13B:
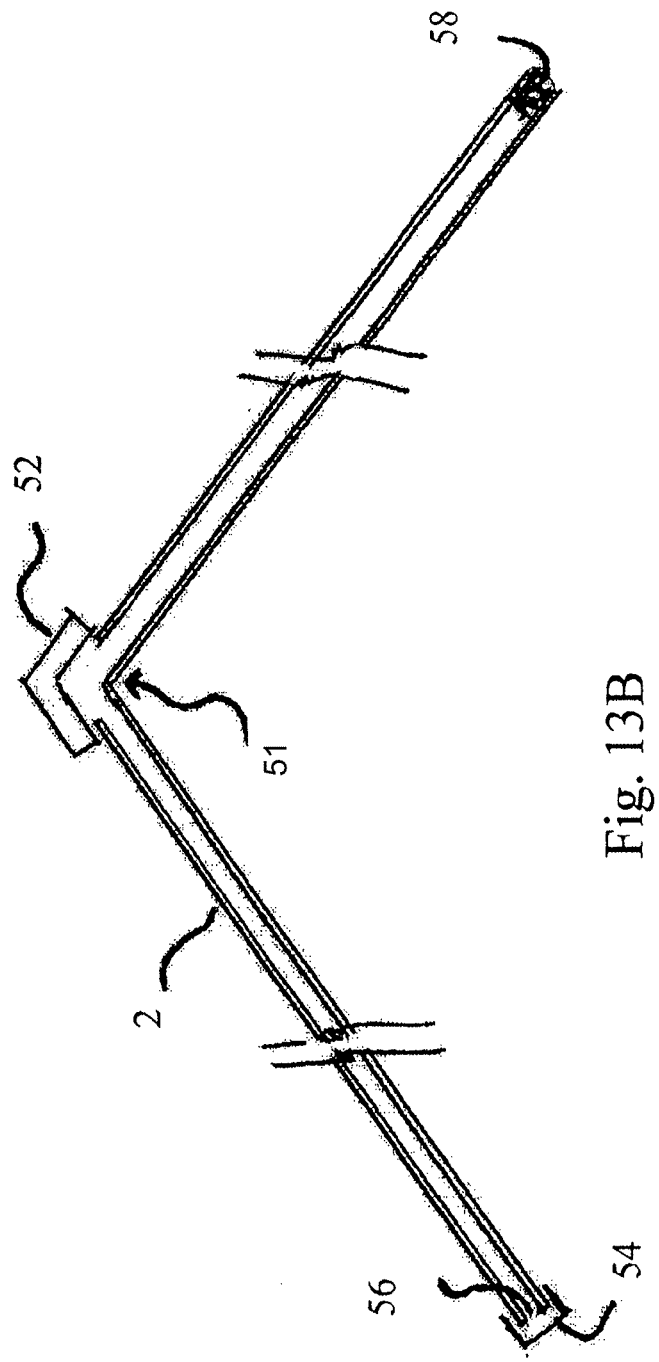

Turning to FIGS. 13A and 13B, two panel roofing arrangements are shown. FIG. 13A shows a panel arrangement suited for unfinished attics and non-living spaces. The panels 2, 2' are arranged so that neither the first nor the second sheets 4, 4', 6 of the panels 2, 2' opposite the ridge meet, leaving an interior ridge gap 48 and an exterior ridge gap. The ridge will be capped with a ridge vent 52. The bottommost terminal edges 56 of the panels 2, 2' will be include a screen 54, insect block 58, or other permeable occlusion, arranged to allow air passage into the interior of the panels 2, 2', but hinder insect entry. FIG. 13B shows a panel arrangement suited for finished attics and living spaces. The panels 2, 2' are arranged so that the first sheets 4, 4' of the panels 2, 2' opposite the ridge meet, forming a solid interior ridge 51, but the second sheets 6 of the panels 2, 2' opposite the ridge meet do not meet, leaving an exterior ridge gap. The ridge will be capped with a ridge vent 52, and the bottommost terminal edges 56 of the panels 2, 2' will be likewise permeably occluded.

Figure 14:
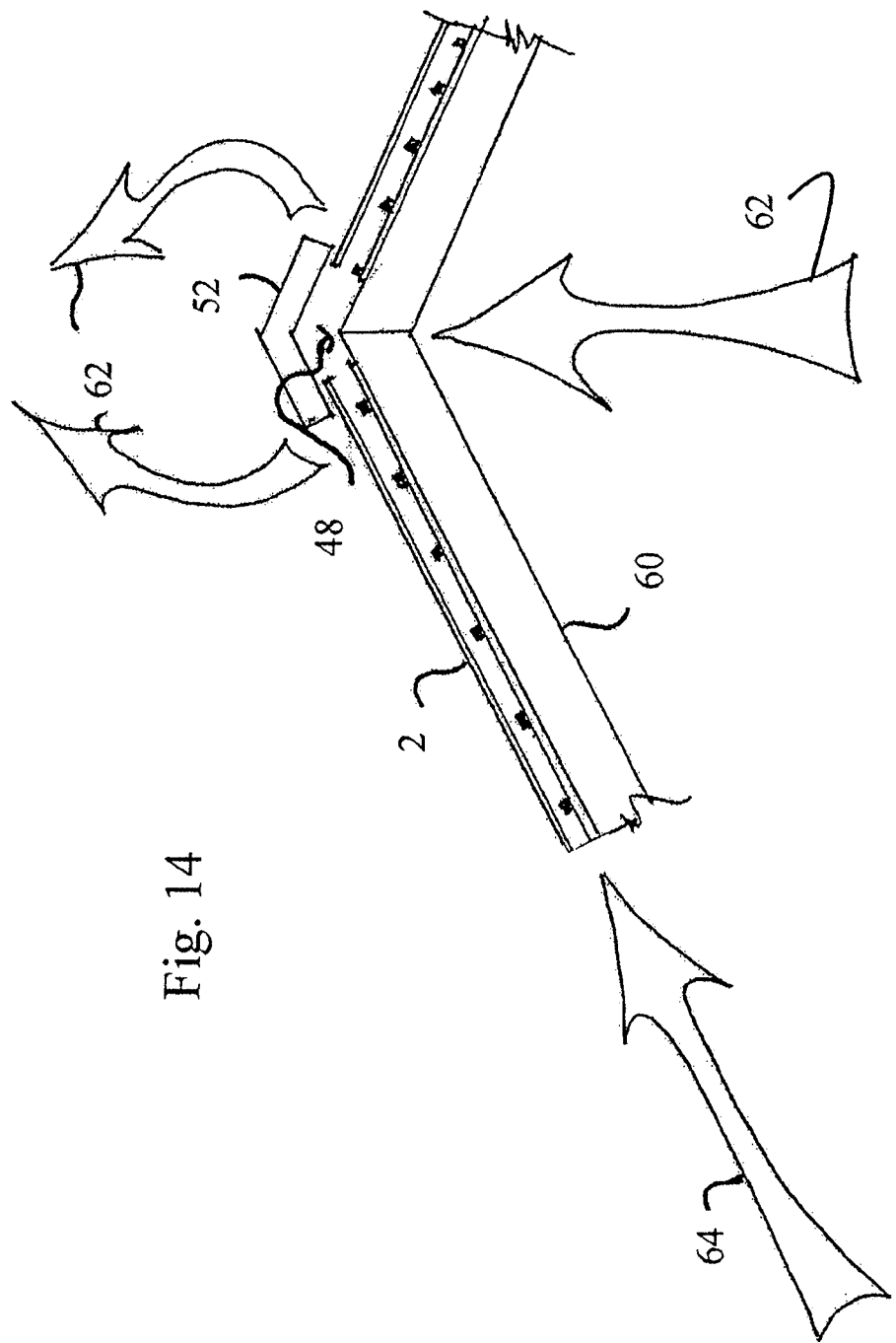
FIG. 14 is a sectional view of a roof arrangement constructed with the panels for an unoccupied attic.

As shown in FIG. 14, a panel arrangement for an unoccupied attic is demonstrated. Panels 2, 2' are arranged on trusses and rafters 60 so as to leave an interior ridge gap 48 and an exterior ridge gap, as described in FIG. 13A. The ridge is capped by a ridge vent 52. Warm, moist air 62 from the interior of the house is exhausted through the ridge vent, via the interior ridge gap 48 and exterior ridge gap. The panels are installed with the permeably occluded 54, 58 terminal edges 56 adjacent to openings in soffits or lower fascia (not shown). Cooler air 64 enters through the permeably occluded 54, 58 terminal edges 56, travels through the interior of the panels 2, 2', absorbing heat from the first and the second sheets 4, 4', 6 and mixing with warm moist air entering through perforations 46, and exits through the ridge vent 52, via the exterior ridge gap.

Figure 15A:
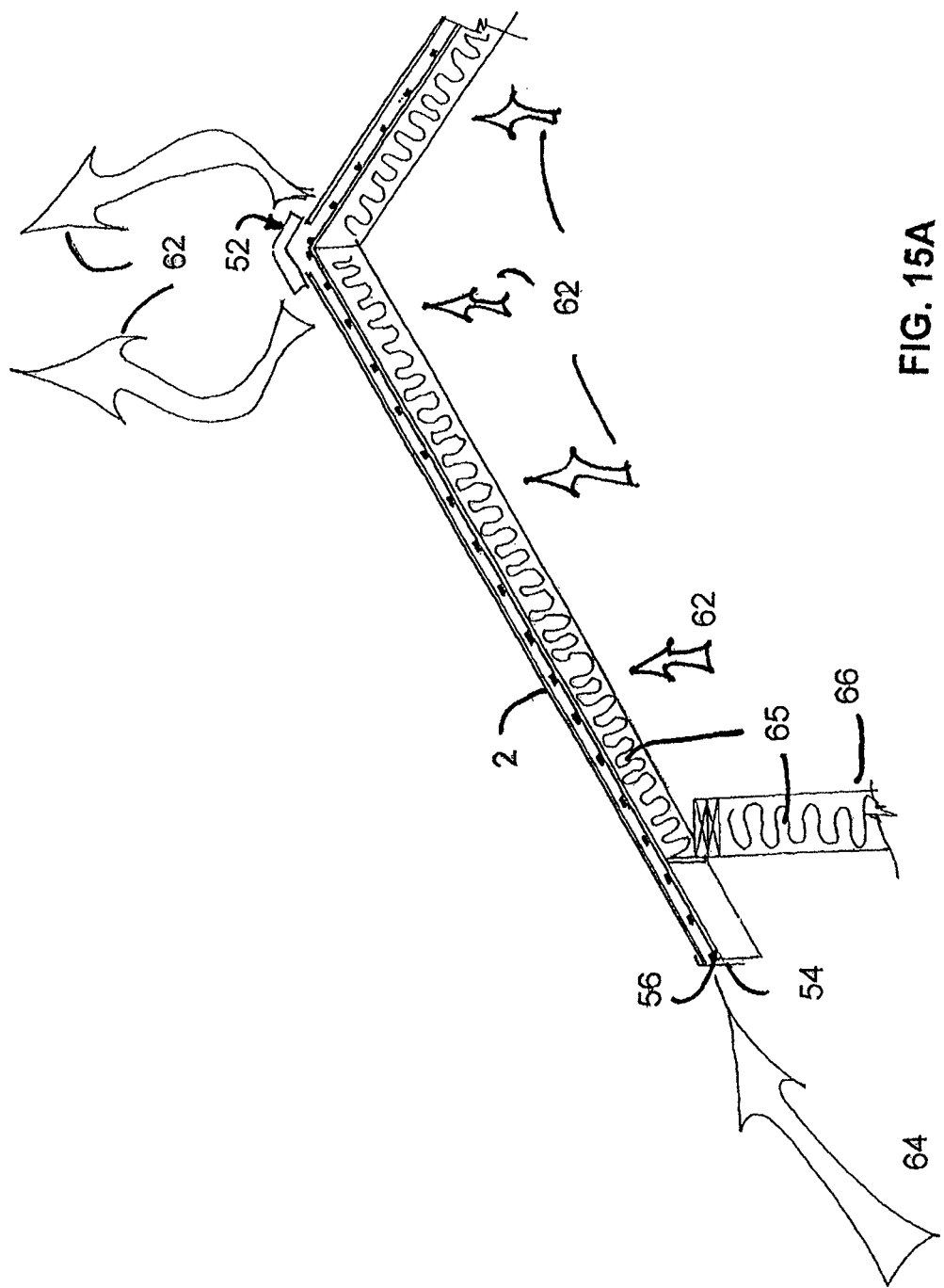
FIG. 15A is a sectional view of a roof arrangement constructed with the panels for an occupied attic.

As shown in FIG. 15A, a panel arrangement for an occupied attic or directly roofed living space is demonstrated. Panels 2, 2' are arranged on trusses and rafters 60 so as to leave an only an exterior ridge gap, as described in FIG. 13B. The ridge is capped by a ridge vent 52. Warm, moist air 62 progresses from the interior of the house through insulation 65 and transfers its heat and moisture to the insulation 65 and first sheets 4, 4' of the panels 2, 2'. The panels are installed with the permeably occluded 54, 58 terminal edges 56 adjacent to openings in soffits or lower fascia (not shown). Cooler air 64 enters through the permeably occluded 54, 58 terminal edges 56, travels through the interior of the panels 2, 2', absorbing heat from the first and the second sheets 4, 4', 6 and exits warm air 62 through the ridge vent 52, via the exterior ridge gap. The upper terminal edges 56 forming the upper ridge gaps in each embodiment may also be permeably occluded 54, 58.

Figure 15B:
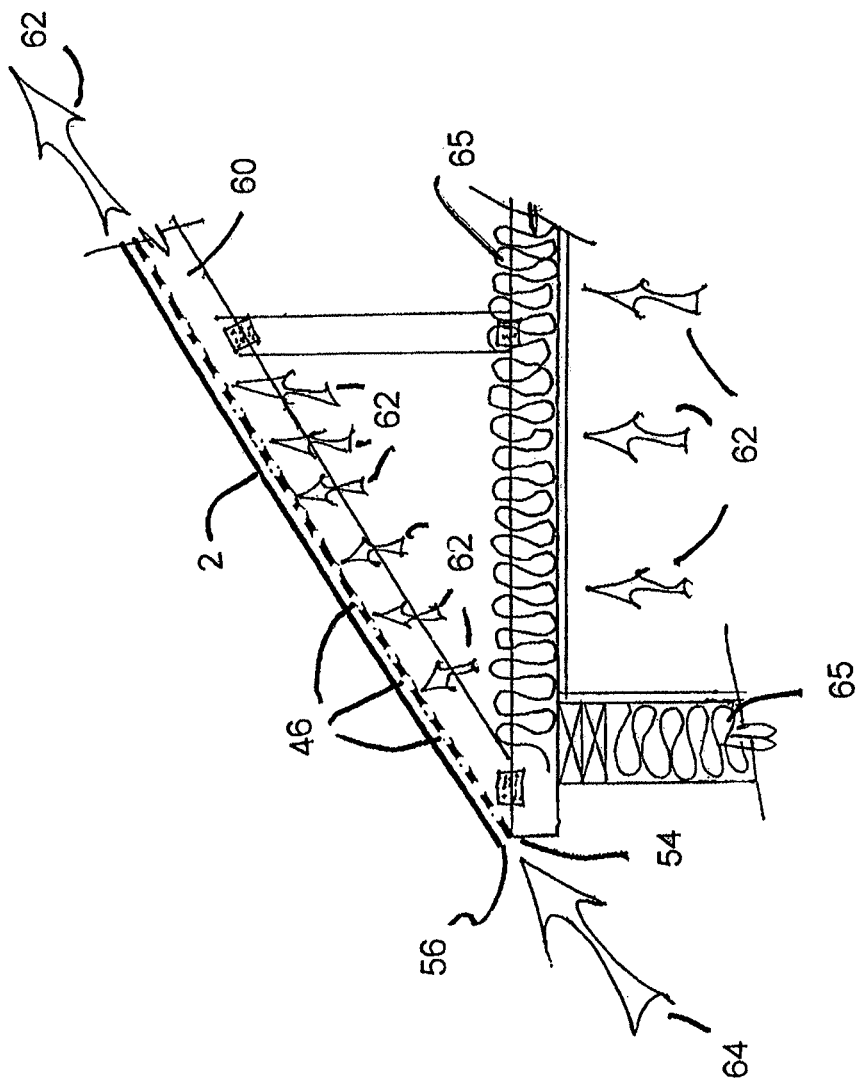
FIG. 15B is a sectional view of a roof arrangement constructed with the panels for an unoccupied attic space, where some of the panels are perforated.

As shown in FIG. 15B a panel arrangement for an unoccupied attic space, using perforated panels is demonstrated. The perforated panels 2' are arranged such that the perforated first sheet faces the interior of the building, allowing warm air 62 to directly enter into the interior of the panel matrix through the perforations 46, from multiple locations in the attic space. Because of the increased ventilation due to the perforations 46 in the perforated panels 2', the panels may be arranged either with or without an interior ridge gap 48. It is envisioned that a ridge vent 52 will be used to cap an exterior ridge gap (not shown) to allow the exhaust of warm air 64 out of the panel matrix, and in combination may be used with one or more gabled vents (not shown).

Figure 17:
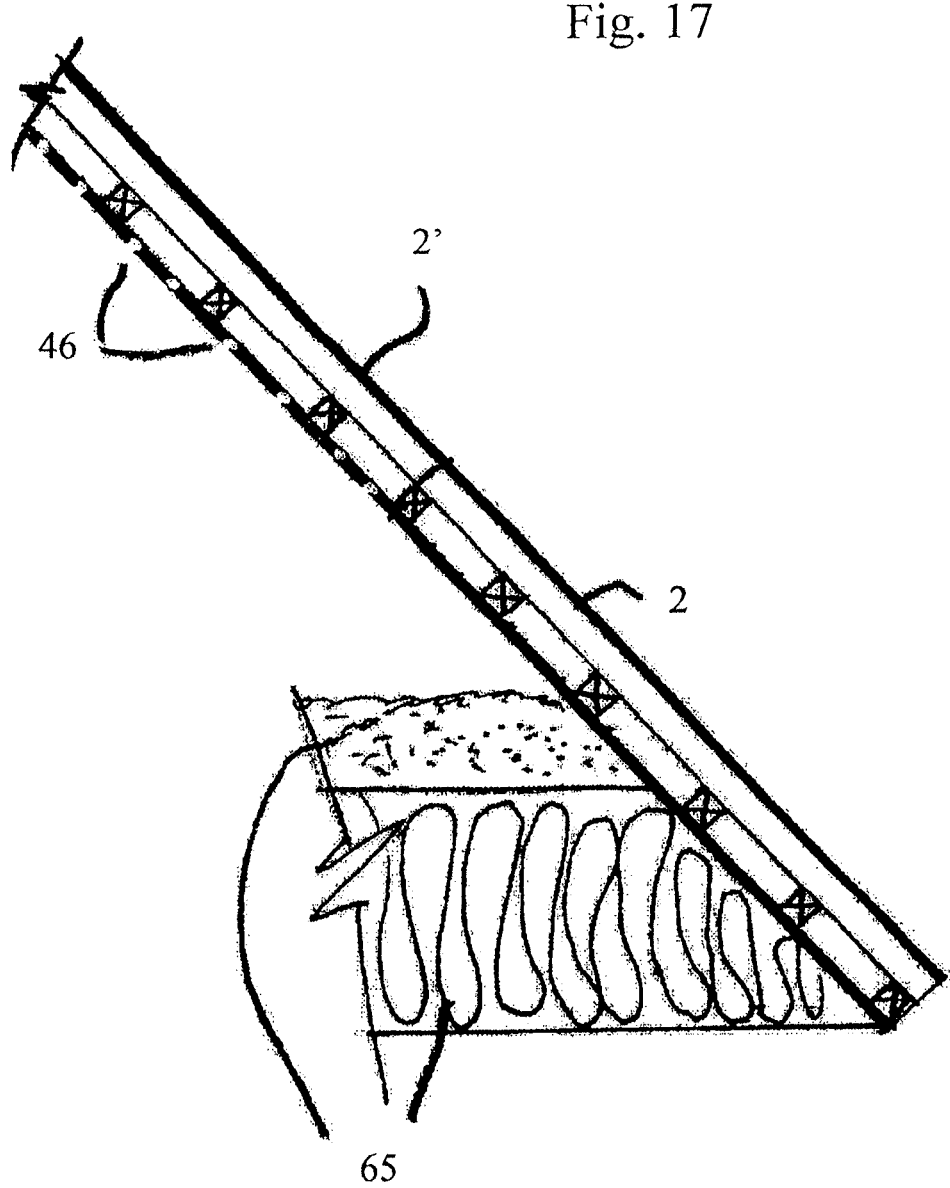
FIG. 17 is a sectional view of a portion of a roof arrangement constructed using perforated and non-perforated panels.

As shown in FIGS. 16 and 17, the perforated panels 2' and non-perforated panels 2 may be used in conjunction in a roofing construction arrangement. In one embodiment, the perforated panels 2' are arranged in the top one or more rows of the roof sheathing and the non-perforated panels 2 are arranged in the bottom one or more rows of roof sheathing. The inner first sheets 4' of the upper rows of panels 2' normally lack abutting insulation 65, allowing warm moist air to more freely enter perforations 46. The inner first sheets 4 of the lower rows of panels 2 normally have abutting insulation 65, diminishing air transfer rates through perforations 46, and therefore would normally have non-perforated first sheets 4. It is to be appreciated that sheeting arrangements of all perforated panels 2', all non-perforated panels 2, or any combination of perforated and non-perforated panels 2' 2, would still fall in the scope of this invention.

Figure 18:
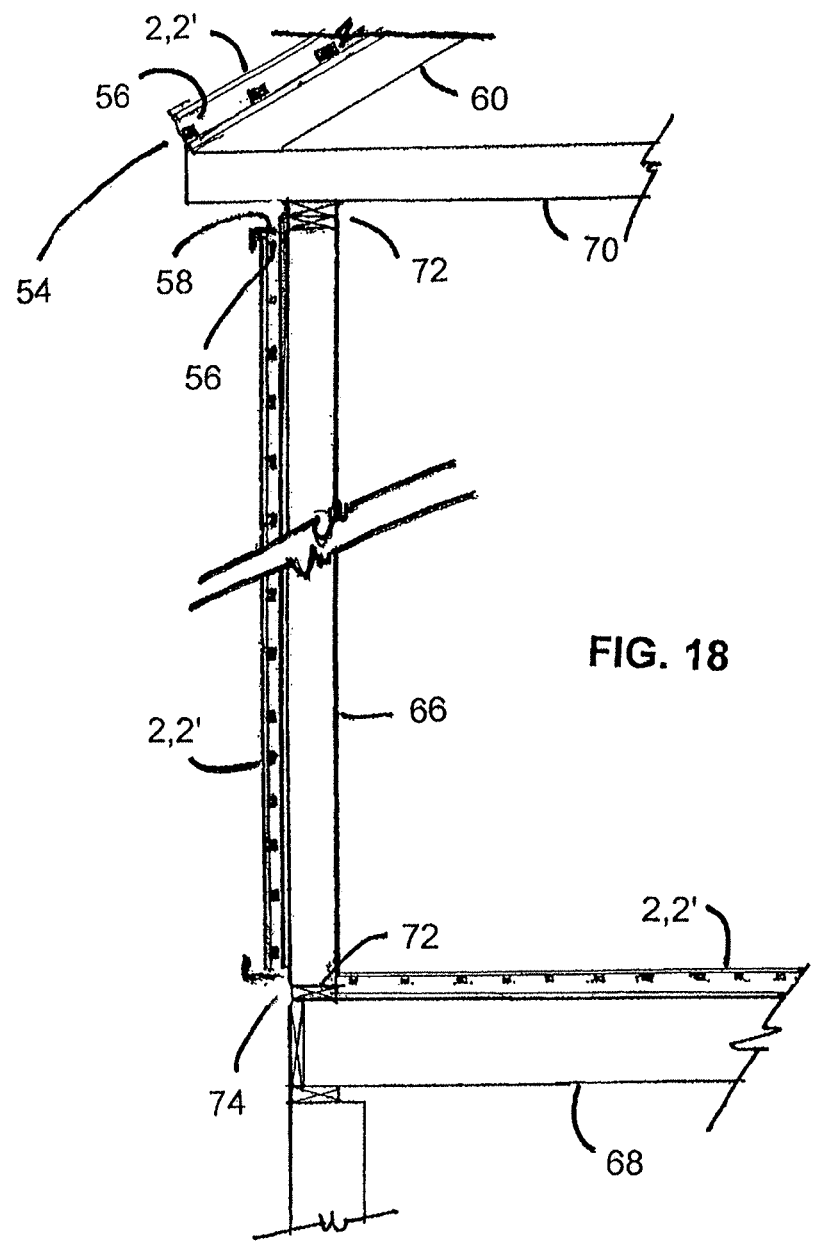
FIG. 18 is a sectional view of a house showing a wall, floor, and roof constructed using the panels.
Figure 19:
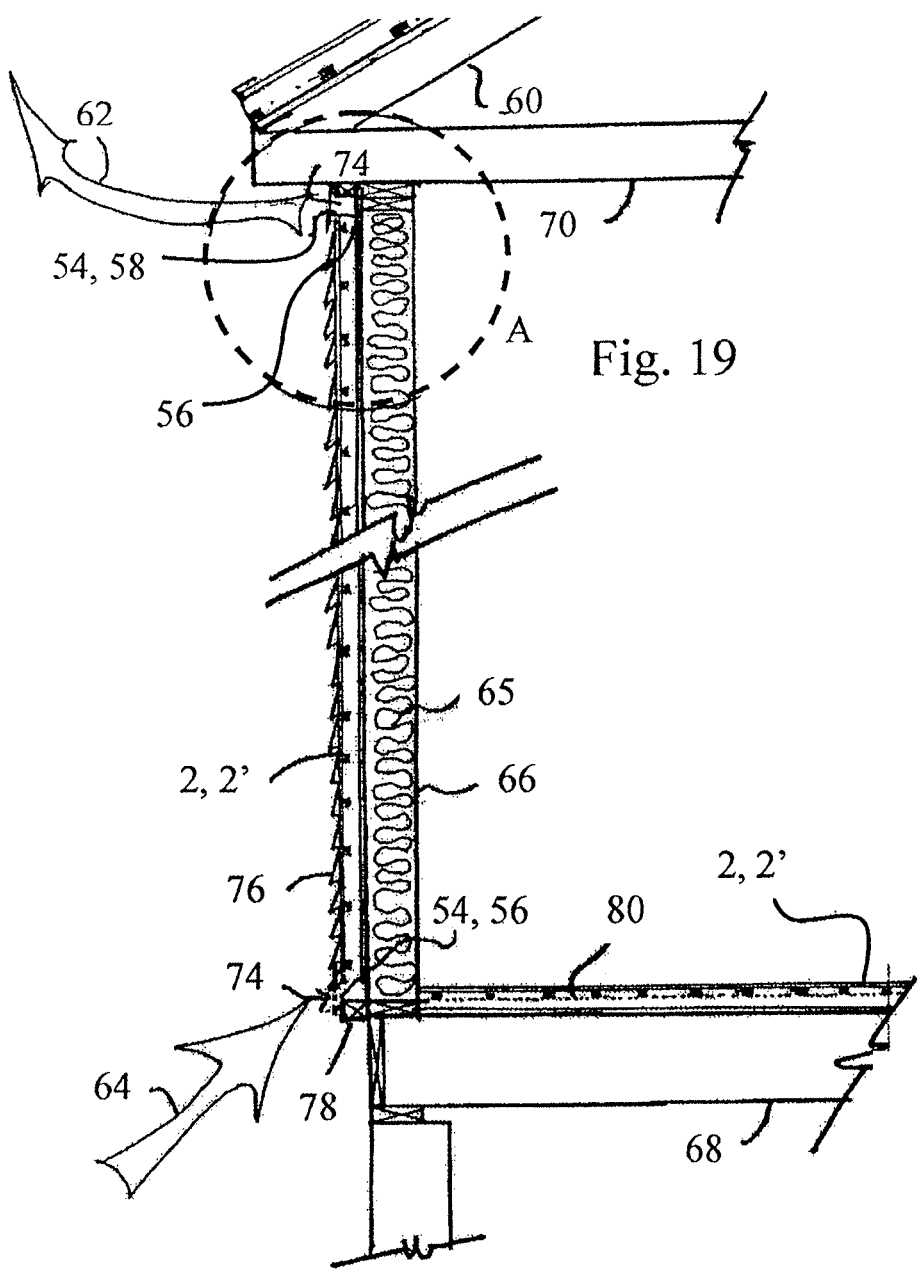
FIG. 19 is a sectional view of an insulated house showing a wall, floor, and roof constructed using the panels.

Turning now to FIGS. 18 and 19, the panels may be likewise used in wall sheathing and flooring. As shown in FIG. 18, a panel 2, 2' may be attached to a wall joist/wall stud 66 and floor joist 68, in a similar manner as traditional sheeting materials. As with roofing embodiments, the terminal edges 56 will include permeable occlusions 54, 58. In one embodiment, a terminal gap 74, facilitated by joist spacing elements 72, here proximate to the ceiling joists 70, provides a passageway for air to inter and exit the interior of the panels 2, 2'.

Figure 20:
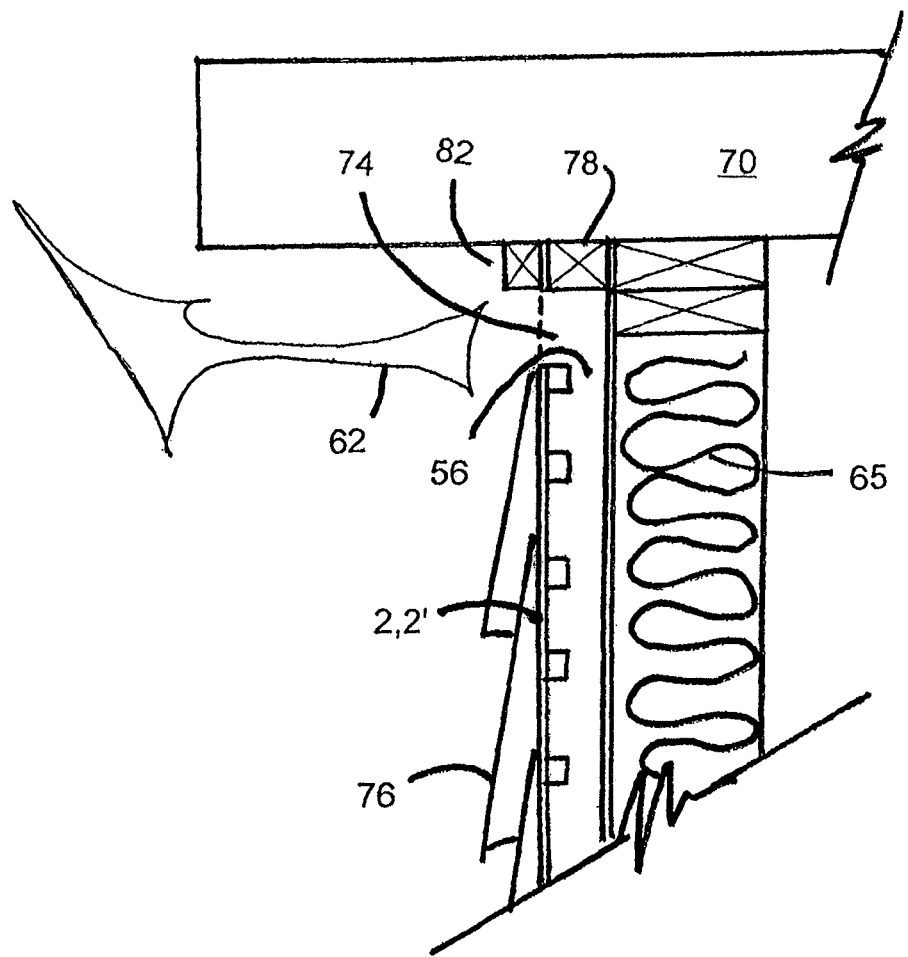
FIG. 20 is an exploded view of the portion indicated as portion A in FIG. 19.
Figure 20A:
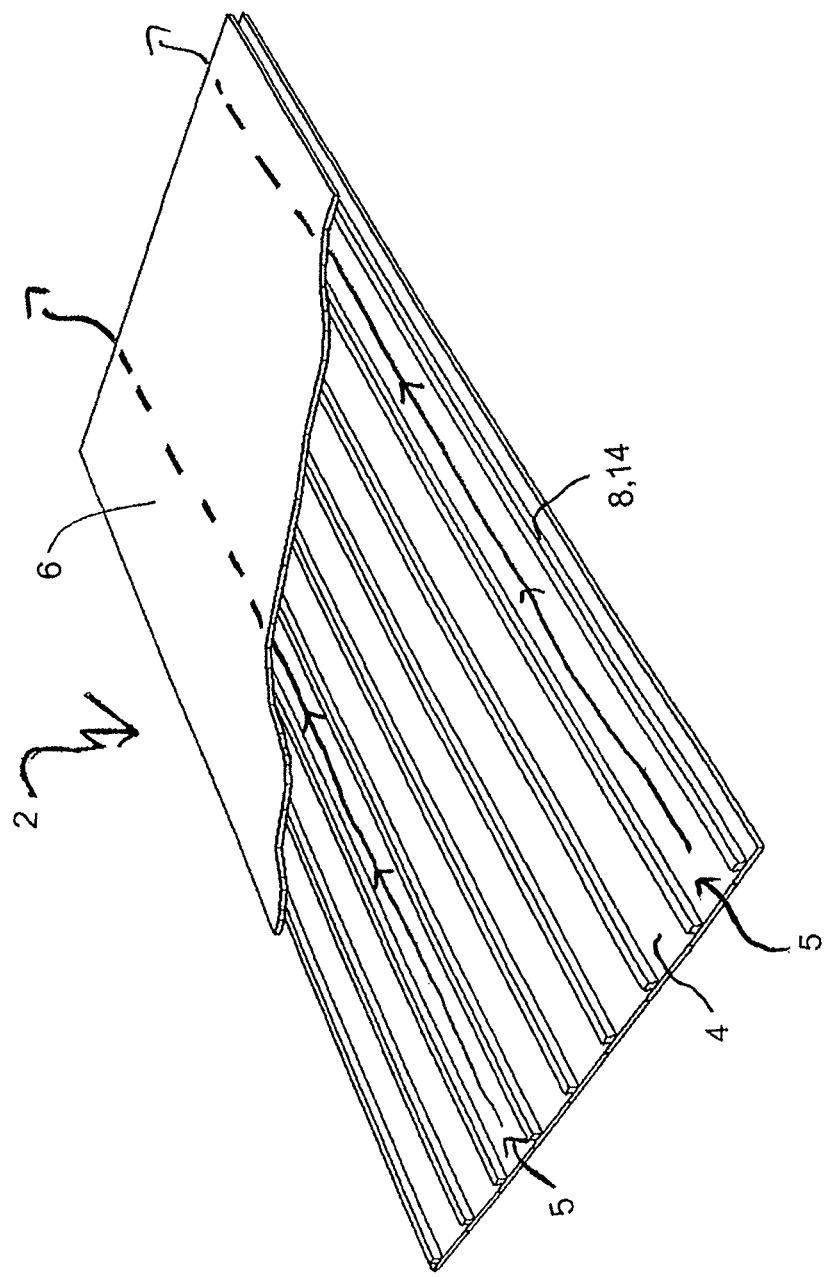
Figure 20B:
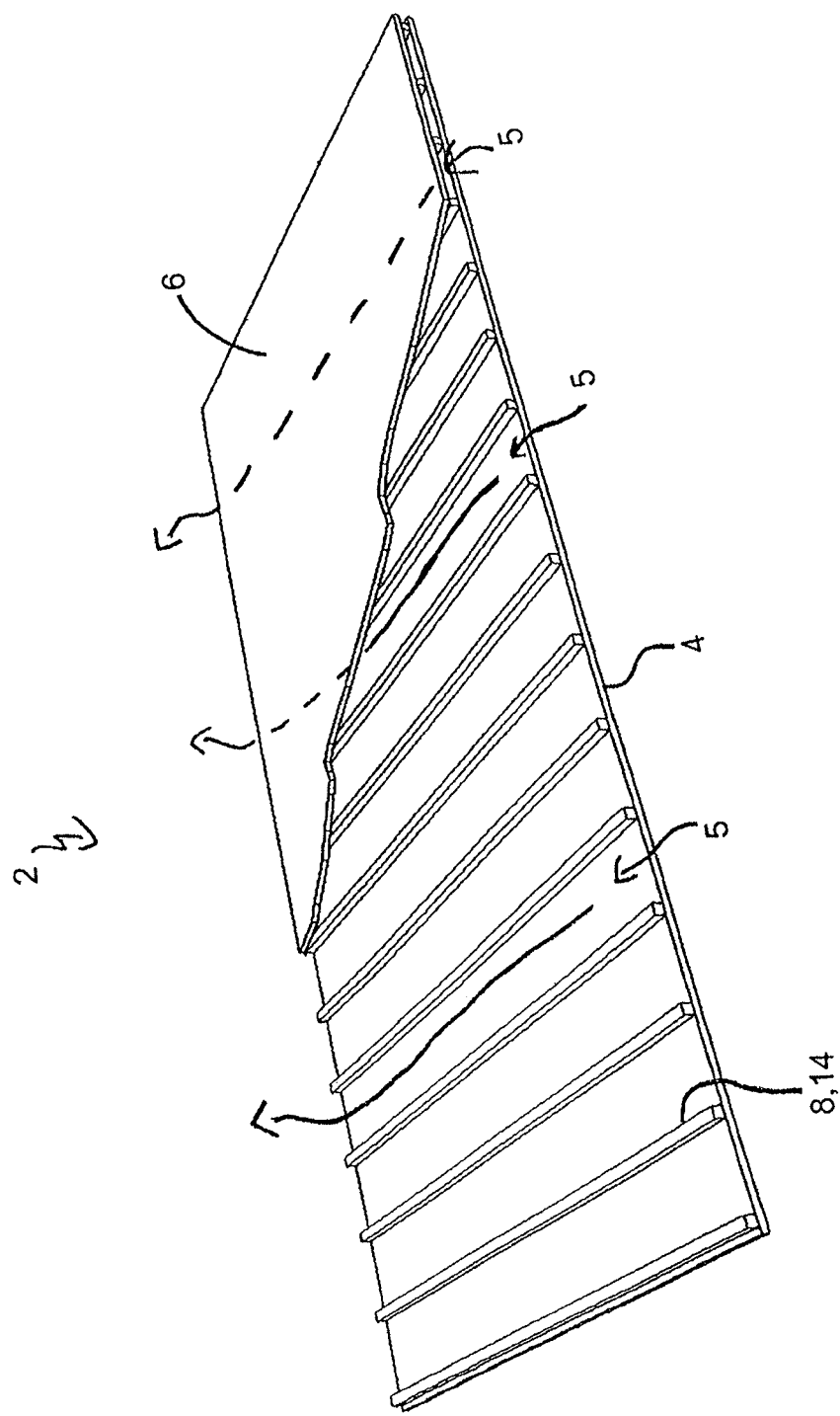

In the embodiment shown in FIG. 19, a panel 2, 2' is attached to an insulated 65 wall joist/wall stud and a floor joist 68, with siding 76 attached to the exterior sheet of the panels 2, 2'. The flooring panel 2, 2' contains a layer of screening 80 between the first layer 10 and the second layer 12 of elongated members 14. Cool air 64 enters the panel 2, 2' interior by passing through a lower terminal gap 74, facilitated by joist spacing elements 72, then through the permeably occluded 54, 58 lower terminal edge 56, moves up through the interior of the panel 2, 2' absorbing heat and moisture from the first and the second sheets 4, 4', 6, and exits warm air 62 through the permeably occluded 54, 58 upper terminal edge 56, and out an upper terminal gap 74. The air flow may be channeled by one or more first channeling component 78, and as shown in FIG. 20, one ore more second channeling components 82. The first and the second channeling components may be decorative as well as functional, and serve additionally as housing trim.

FIG. 20 shows a close up of the upper section of FIG. 19, indicated as portion A, showing in detail the upper terminal gap, and the first and the second channeling components 78, 82.

Figure 21:
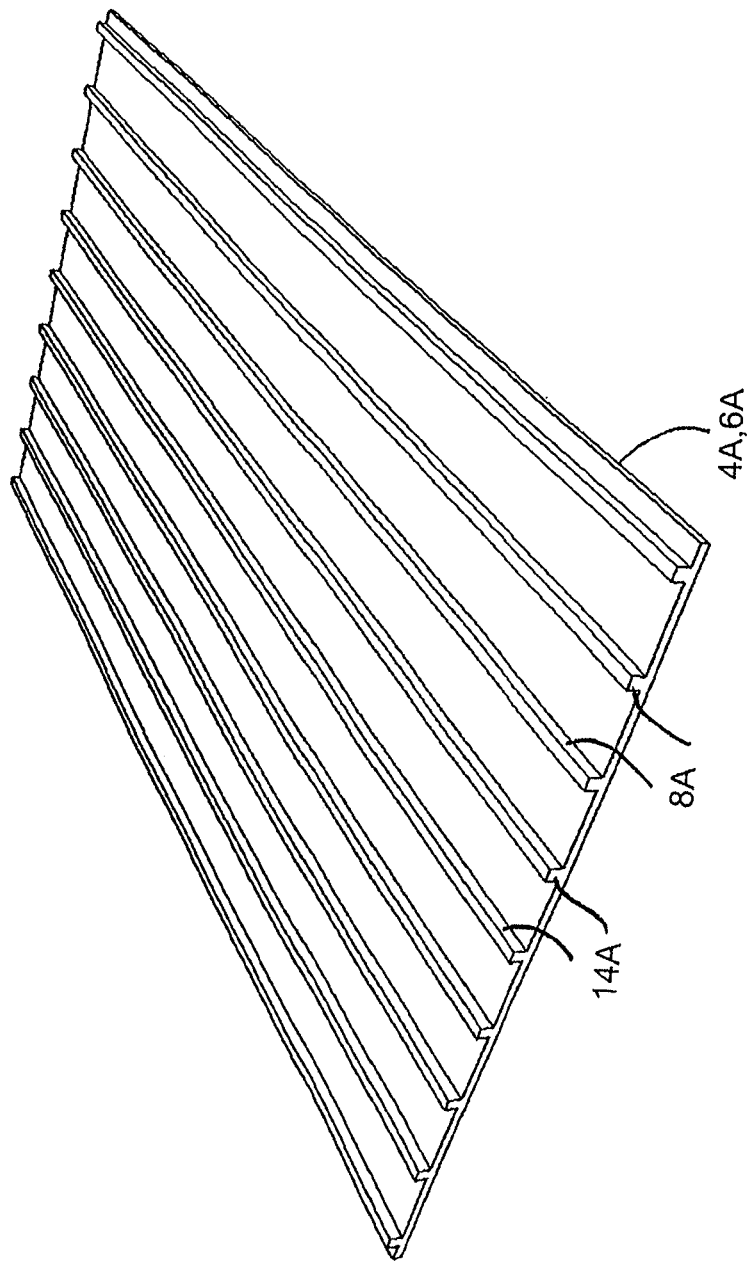
FIG. 21 is an iso-view of a panel with a sheet having integrated spacing structural elements.
Figure 22:
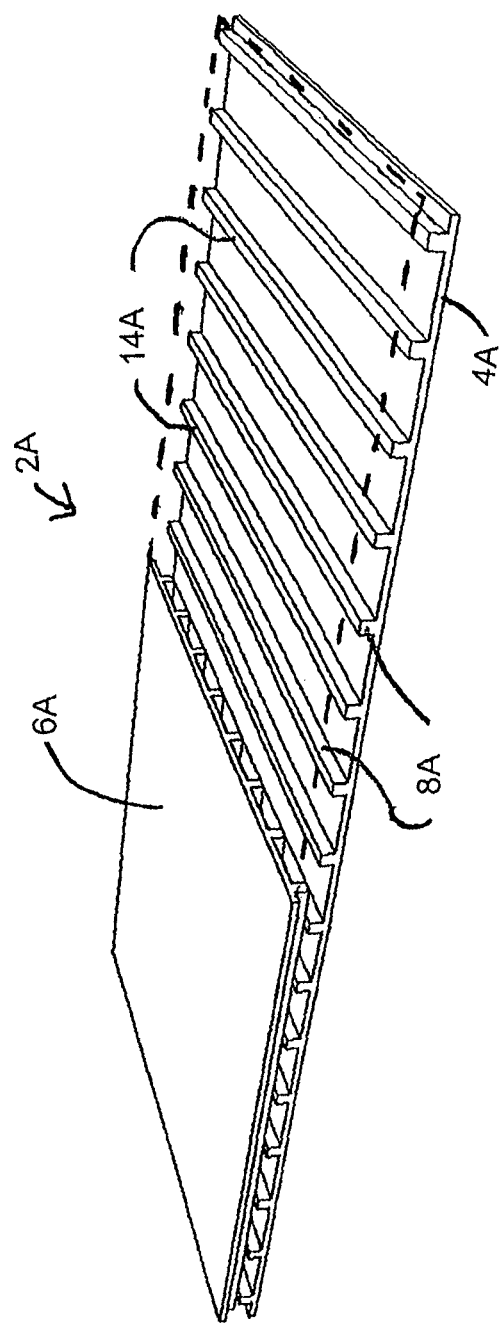
FIG. 22 is an iso-view of a panel with two sheets, each having integrated elongated members, with a portion of the top sheet cutaway to show detail.
Figure 23:
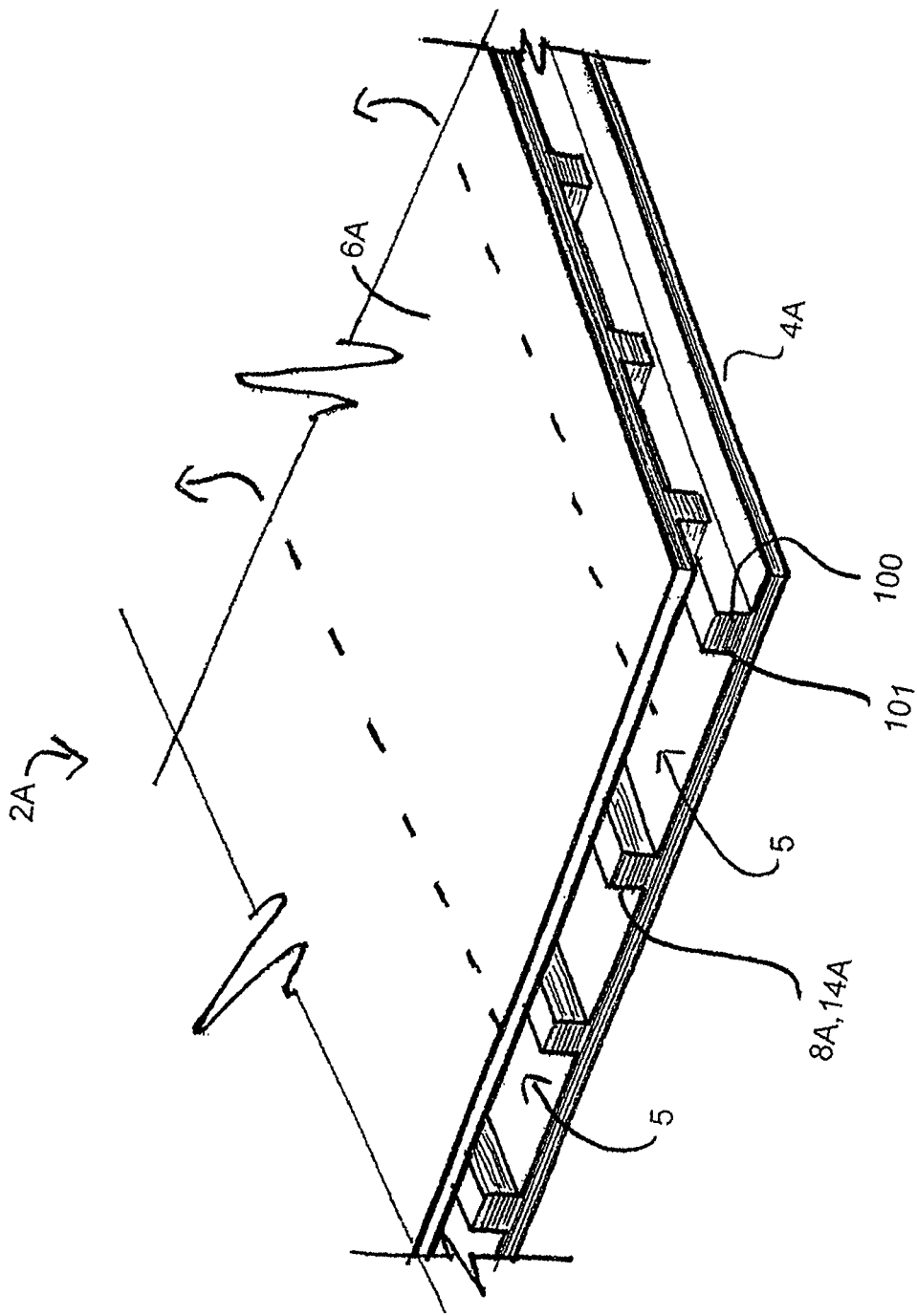
FIG. 23 is an iso-view of a panel with two sheet, each having integrated elongated members with rectangular profiles.
Figure 24:
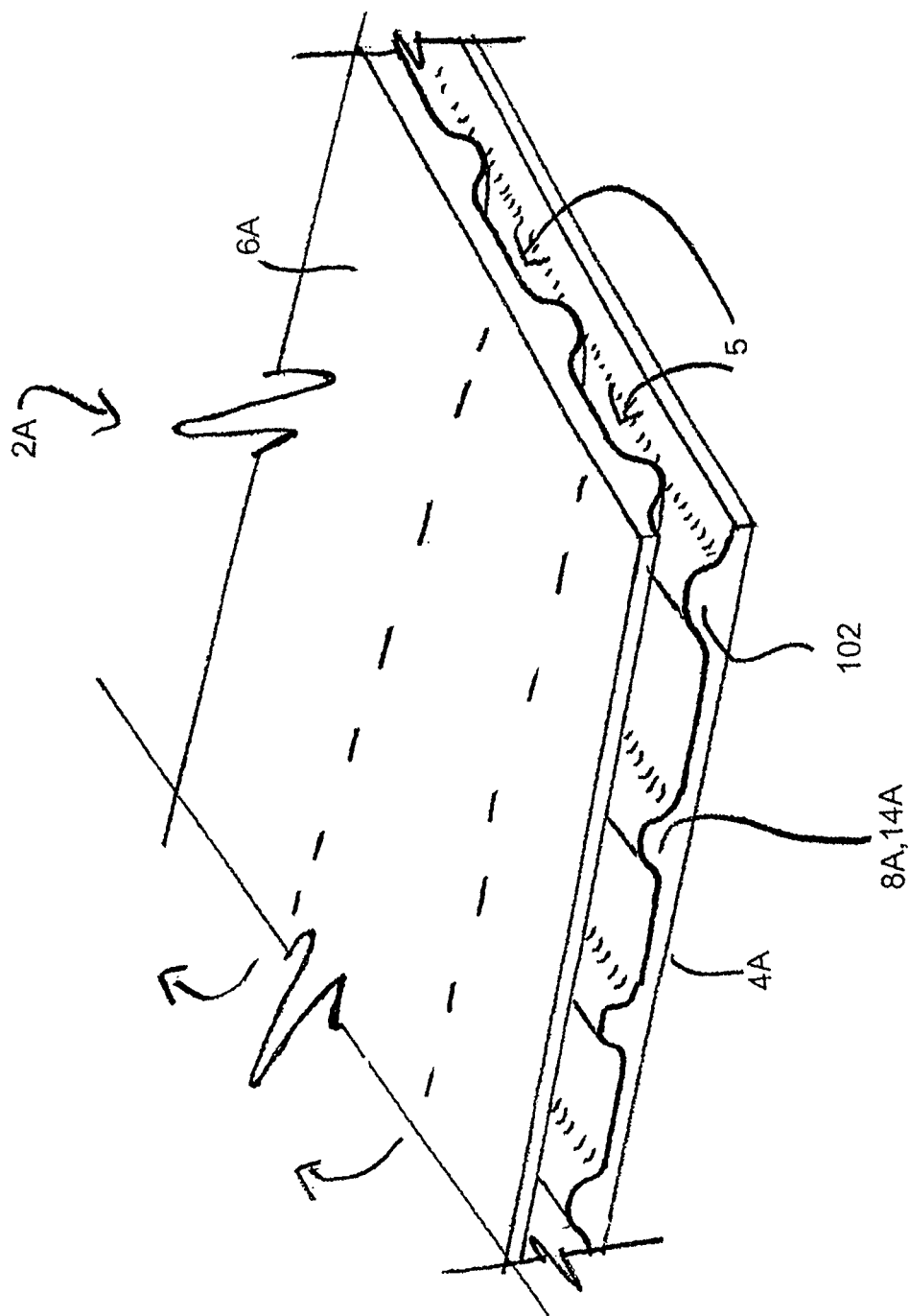
FIG. 24 is an iso-view of a panel with two sheets, each having integrated elongated members with curved profiles.

Turning to FIGS. 21 and 22. A first sheet 4A of a panel 2A with integrated spacing structural elements 8A is shown. The spacing structural elements 8A may take the form of, for example, integrated blocks 44A (not shown) or integrated elongated members 14A. In panels 2A employing integrated elongated members 14A, the integrated elongated members 14A generally run horizontally on a first sheet 4A and will generally run vertically on a second sheet 6A.

Turning to FIGS. 23, 24, and 26A-D, the profiles of the integrated elongated members are generally either rectangular 100, square 101, or curved 102, or some combination of each, depending upon the application requirements, each providing a plurality of parallel, unobstructed, contiguous pathways 5. As shown in FIG. 26, for example, the integrated elongated members may have flat tops 104, flat sides 106, and angled edges 108, and/or curved tops 110, curved sides 112, and rounded edges 114 or chamfered edges 116. Additionally the sides maybe perpendicular where they intersect the top and/or the interior surface of the sheet 4A, 6A, or at a non-perpendicular angle.

Figure 25:
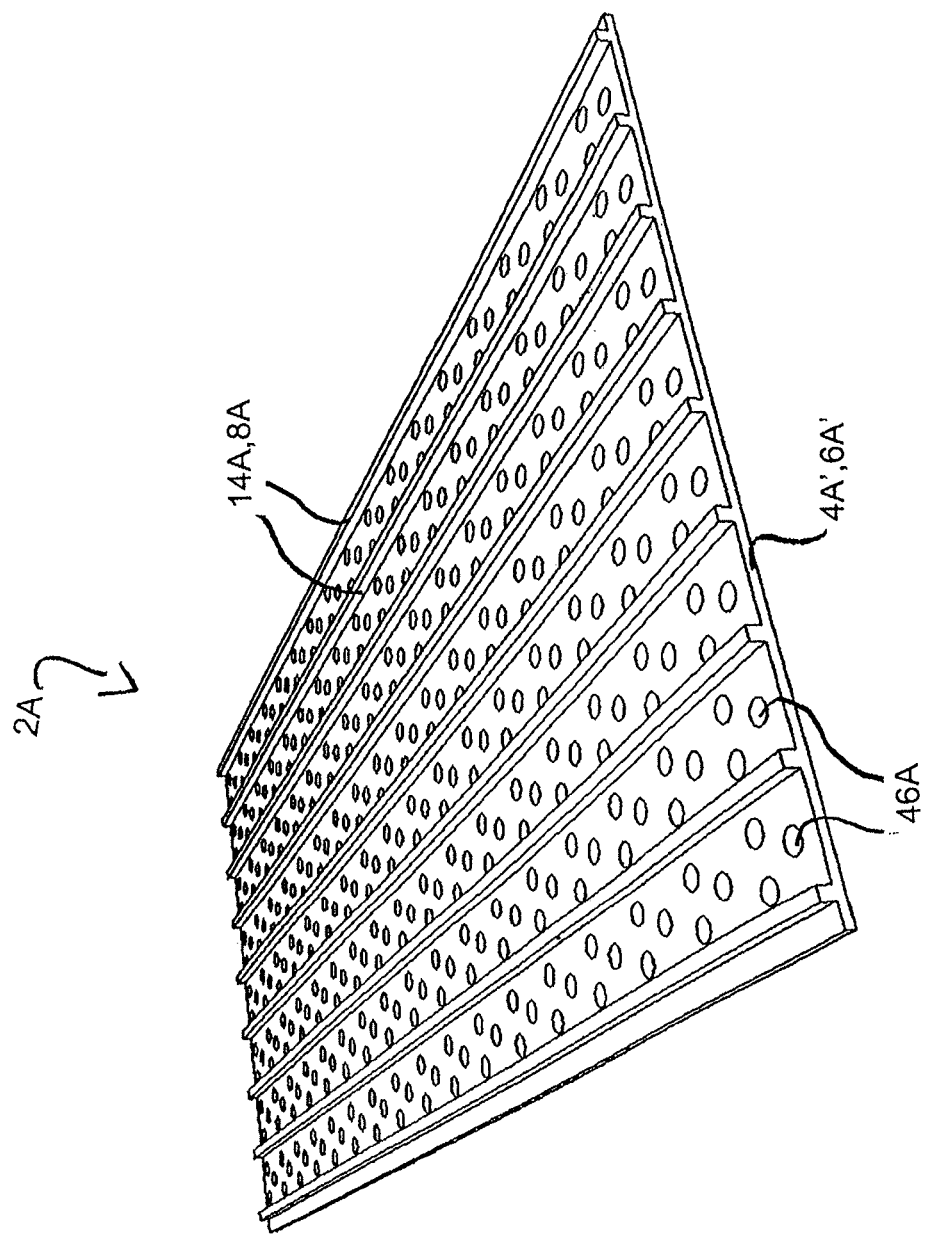
FIG. 25 is an ISO view of a sheet having integrated elongated members and the plurality of perforations.

As shown in FIG. 25, similar to panels 2' described above, a first sheet 4A' and/or second sheet 6A' of panels 2A' with integrated elongated members 14A may also possess perforations 46A, and may be used in similar embodiments as those described in paragraphs above.

Figure 27:
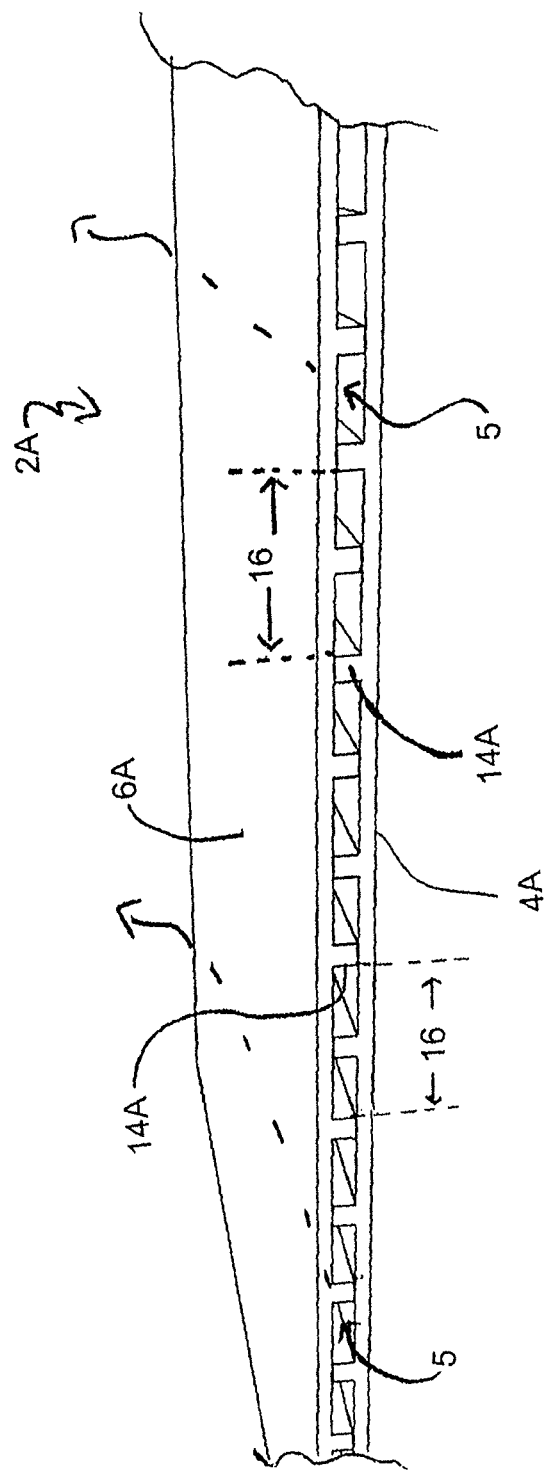
FIG. 27 is an iso views of a panel comprised of a single layer of nesting elongated members.

Turning to FIG. 27, a panel 2A comprised of a first and a second sheet 4A, 6A, each having integrated elongated members 14A. In this embodiment, the integrated members 14A on the first sheet 4A are arranged parallel to the integrated members 14A on the second sheet 6A. This arrangement allows the integrated members 14A on the first sheet 4A to be nested within the spacing distance 16 separating the integrated members 14A on the second sheet 6A from one another, when the first and the second sheet 4A, 6A are brought together to form the panel 2A. In the same way, this allows the integrated members 14A on the second sheet 6A to be nested within the spacing distance 16 separating the integrated members 14A on the first sheet 4A from one another. The integrated members 14 A on the first sheet 4A would attach directly to the interior surface of the second sheet 6A in this embodiment. The parallel unobstructed continuous pathways 5 for air would be defined by the interior surface of the first and second sheets 4A, 6A and their respective integrated members 14A, similar to a other single layer embodiments, as compared to being defined by the interior surface of one of the first sheet and second sheet 4A, 6A, and at least three separate elongated members 14, 14A, as in multiple layer embodiments.

In a related embodiment, integrated elongated members 14A of a first and second sheet 4A, 6A could be arranged parallel such that, instead of nesting within respective spacing distances 16 in the posing sheets 4A, 6A, as shown in FIG. 27, the parallel elongated members 14A of each sheet 4A, 6A could stack substantially directly on top of one another along the full length of the elongated members 14 A (not shown). This would create parallel unobstructed continuous pathways 5 for air that would be two elongated members 14A high, and defined by for elongated members 14 A, two from each of the first and the second sheet 4A, 6A, and the interior surface of both the first sheet 4A and the second sheet, 6A.

Figure 28:
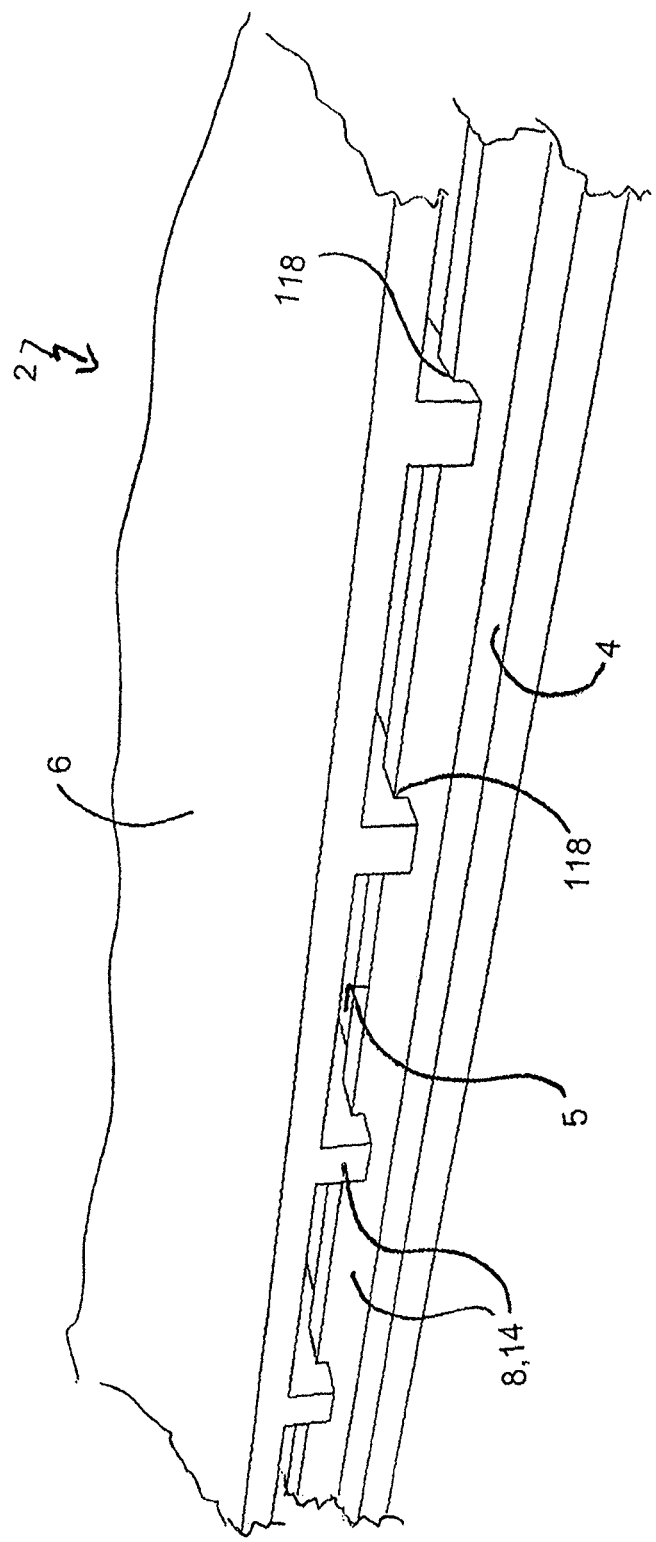
FIG. 28 is an up close iso view of two elongated members with a notched attachment.
Figure 29:
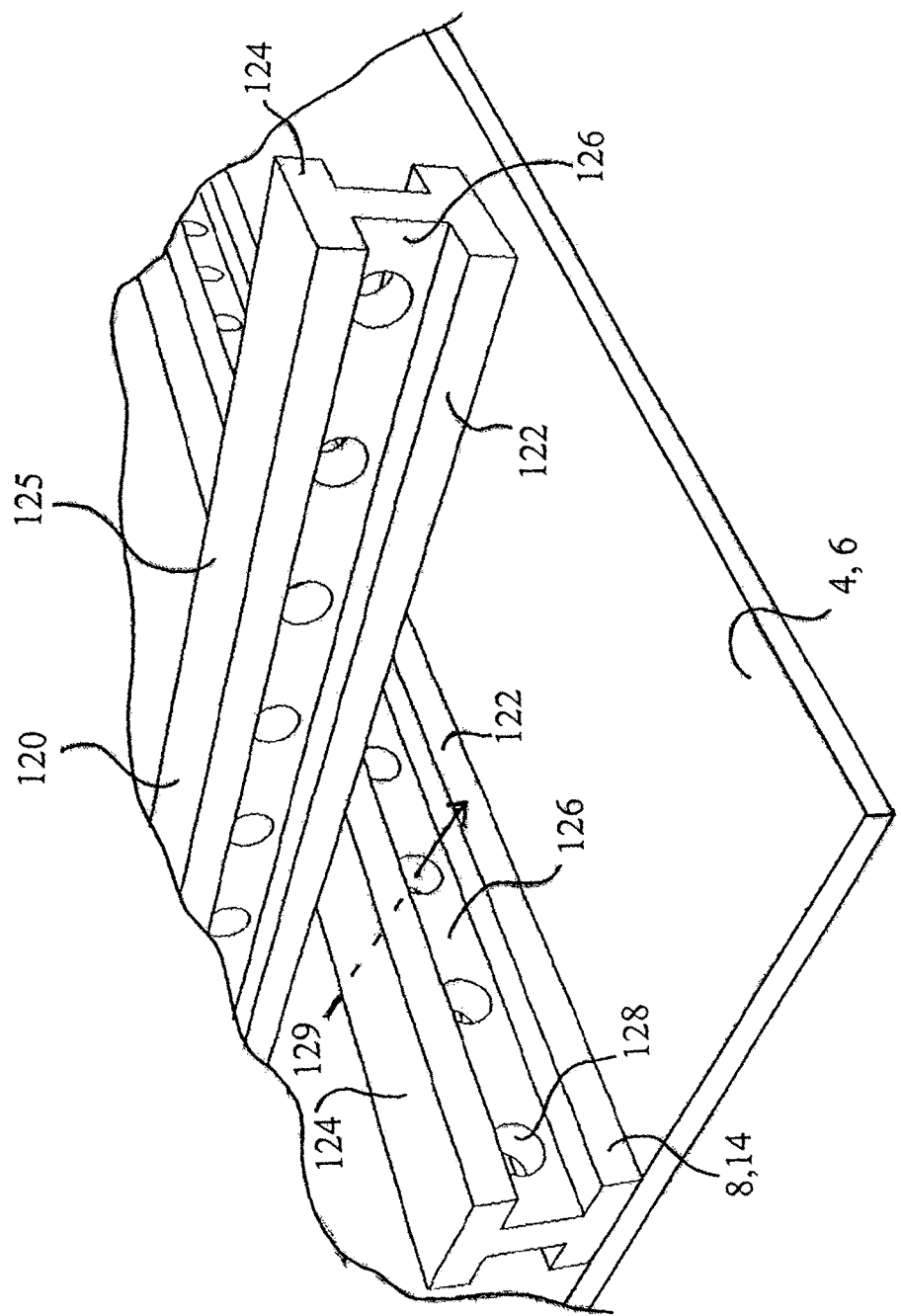
FIGS. 29-31 are an up close perceptive views of panels using three different embodiments of specialized shaped engineered matrix members, where the top sheet in each panel is not shown.

Turning to FIG. 28, a panel 2 is shown wherein the respective elongated members 14 of the first and the second sheets 4A, 6A interacts with one another at their point of attachment in a notch/recess fashion. At the point where a first elongated member 14 contacts a second elongated member 14, one or both of the first and the second elongated member 14 is provided with a notch 118. In the case where only one of the first nor the second elongated member is provided with a notch 118 at their point of interaction, this allows either the first or second elongated member 14 to recess into the notch 118 on the opposed elongated member 14. Or, in the case that both the first and second elongated members 14 are provided with opposing notches 118 at the point of interaction, this allows each elongated member to recess into the notches 118 provided on the opposed elongated member 14. While this notch/recess arrangement creates a potentially stronger bond amongst the elongated members 14 and therefore the panel 2 as a whole, at the same time this decreases the size of the parallel, contiguous, unobstructed pathways 5 for air within the panel 2.

Additional embodiments of the elongated matrix members 14 are envisioned. In their simplest form, an elongated matrix member 14 is a stick or extrusion with a square or rectangular cross section and a length equal to a parallel axis of the sheet 4, 6 to which it is attached. The elongated matrix members 14 are ideally ¾"×¾" in cross section, but, as mentioned above, can be larger (2" or greater) or smaller (¼" or smaller) as required for the application. The elongated matrix members 14 are preferably attached to at least one sheet 4, 6 and to one another where multiple layers of elongated matrix members 14 intersect, in order to transfer shear stresses, though the elongated matrix members 14 may have one or more locations where they intersect that they are not attached, in order to increase flexibility of the overall panel, as may be required in certain situations.

Additionally, engineered matrix members 120 can be utilized and manufactured from a variety of materials, like organic, wood, cellulose or other fibrous materials, plastics, metals or other materials that can be shaped or extruded, and can be formed into the square or rectangular cross sectional shapes discussed previously, or formed into one of many specialized shapes.

Specialized shaped engineered matrix members 120 will preferably have a first flat section 122 with a rectangular outer face, an opposed second flat section 124 with a rectangular outer face, and transverse section 126 connecting an inner face of the first flat section 122 to an inner face of the second flat section 124. The outer face of at least one of the first and the second flat section 122, 124 will preferably be attached to at least one of a sheet 4, 6 and an outer face of a first or a second flat section 122, 124 of an additional specialized shaped engineered matrix member 120 disposed in an adjacent layer. The range of shapes and structures of the specialized shaped engineered matrix members 120 will vary mainly based upon the design of the transverse section 126.

In a first embodiment of specialized shaped engineered matrix members 120, "I" beam shaped members 125 are formed by the first and second flat sections 122, 124 of engineered matrix members 120 being joined by a relatively thin and elongate transverse section 126. The thin elongate transverse section 126 and the inner faces of the first and the second flat sections 122, 124 define two narrow channels, one on each side of the thin elongate transverse section. These narrow channels act to increase the size of parallel, contiguous, unobstructed pathways 5 for air to pass between two adjacent "I" beam shaped members 125 of a common layer, as compared to similarly spaced elongated members 14 with a square or rectangular cross section.

Additionally, the thin elongate transverse sections 126 in the "I" beam shaped members 125 may be solid or perforated. The perforated "I" beam shaped members 125 offer the benefit of enhanced cross ventilation performance and increase the interior cabling options of the panels, as the perforations 128 provide additional pathways 129 for air and/or cables to pass through the panel 2, and through the very "I" beam shaped members 125. Either perforated or solid, the "I" beam shaped members 125 offer the benefit of being easily extruded and utilized in a panel 2.

Figure 30:
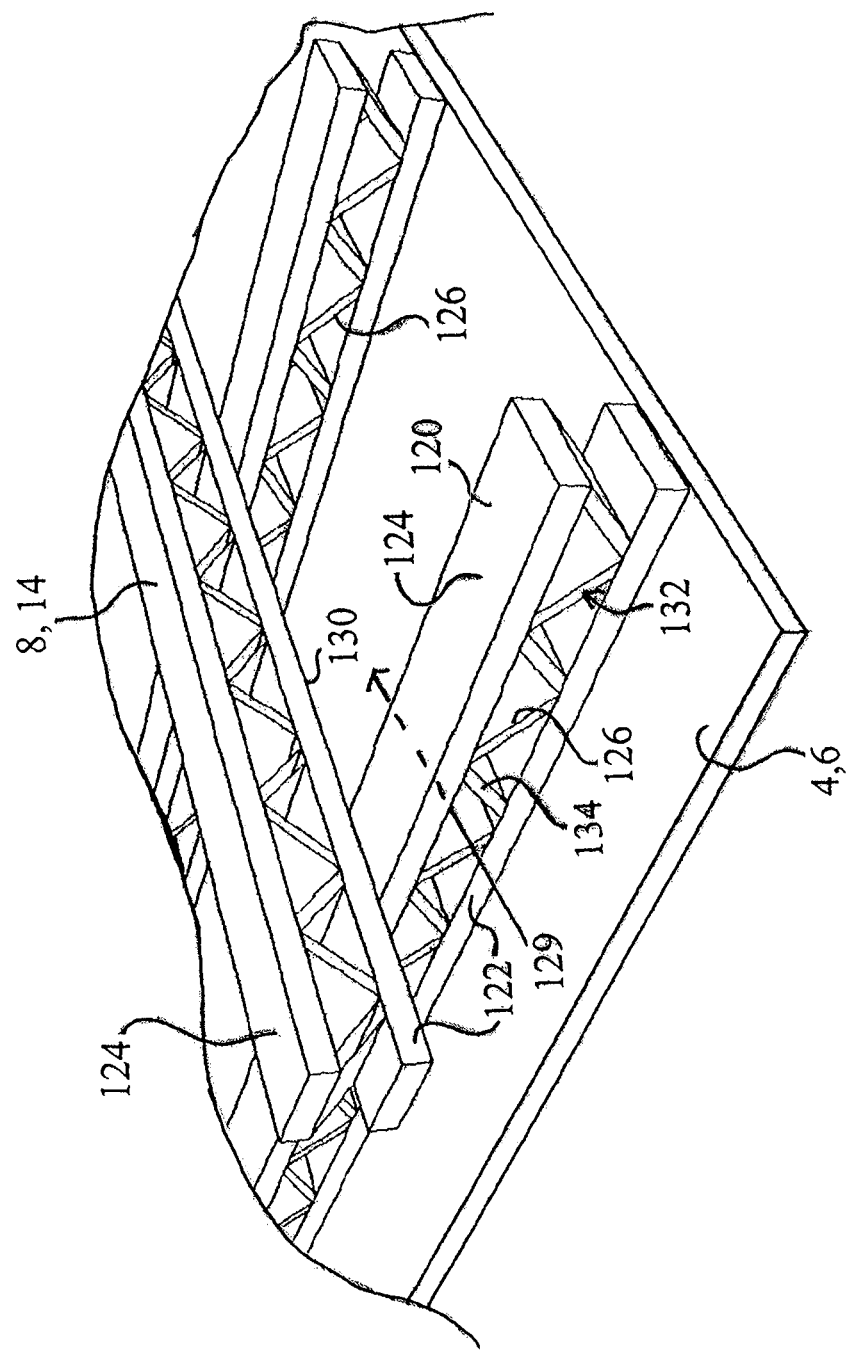

Turning to FIG. 30, in a second embodiment of specialized shaped engineered matrix members 120, "truss" shaped members 130 are constructed by the first and second flat sections 122, 124 of engineered matrix members 120 being joined by a truss web 132 transverse section 126. The truss web 132 is formed of a plurality of truss web supports 134 that can be both diagonal supports of the same or varying angles, and vertical supports. The truss web supports 134 will normally be of approximately an equal width as that of the first and the second flat sections 122, 124.

In a first embodiment of truss shaped members 130, the truss web 126 is comprised of a plurality of diagonal truss web supports 134 that form a continuous series of triangles down the length of the truss shaped member 130. That is, except for terminal ends of the truss shaped members, at each intersection of a diagonal truss web support 134 with the inner face of the first and the second flat sections 122, 124, another diagonal truss will also intersect the same inner face of the first and the second flat sections 122, 124 at an adjacent location. Such adjacent intersections form a triangulated parallel chord truss. The truss web supports 134 can be comprised of folded or formed material, and similar to the perforated "I" beam shaped members 125, the truss shaped members 130 to facilitate additional air flow and additional pathways for running cables and pipes through the panels 2, especially with the additional pathways diagonally and orthogonally through the specialized shaped engineered matrix members 120.

Figure 31:
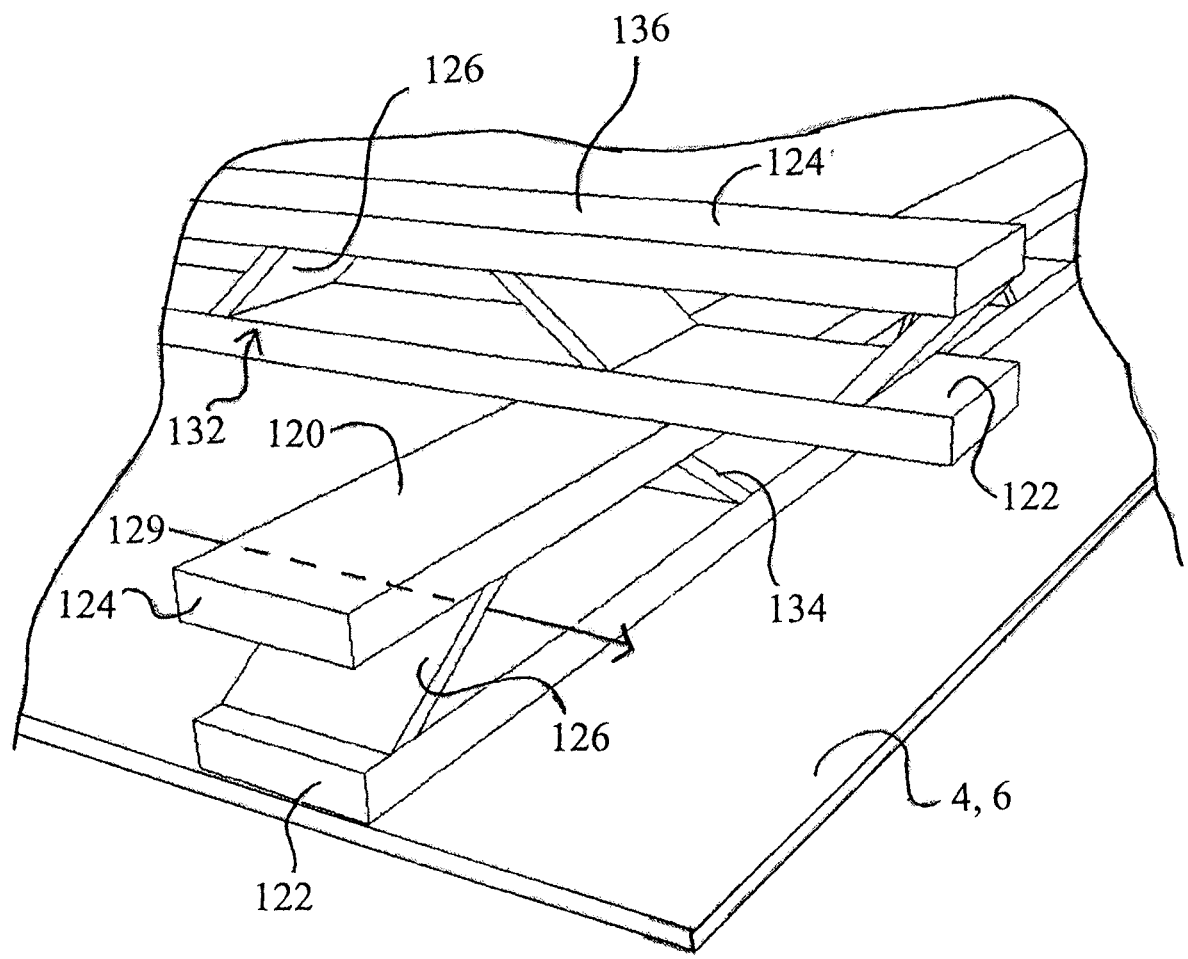

Turning to FIG. 31, in a second embodiment of truss shaped members 130, the intersection of the diagonal truss web supports 134 with the inner face of the first and the second flat sections 122, 124 can be spaced either a fixed or varying distance from one another. These "skip truss" shaped members 136 are similar to the truss shaped members 130, but because they have less truss web supports 134, they are less costly to manufacture and fabricate and offer increased size and angles of pathways through the panels 2 and the specialized shaped engineered matrix members 120, while still retaining much of the superior strength qualities of the truss shaped members 130.

Figure 32:
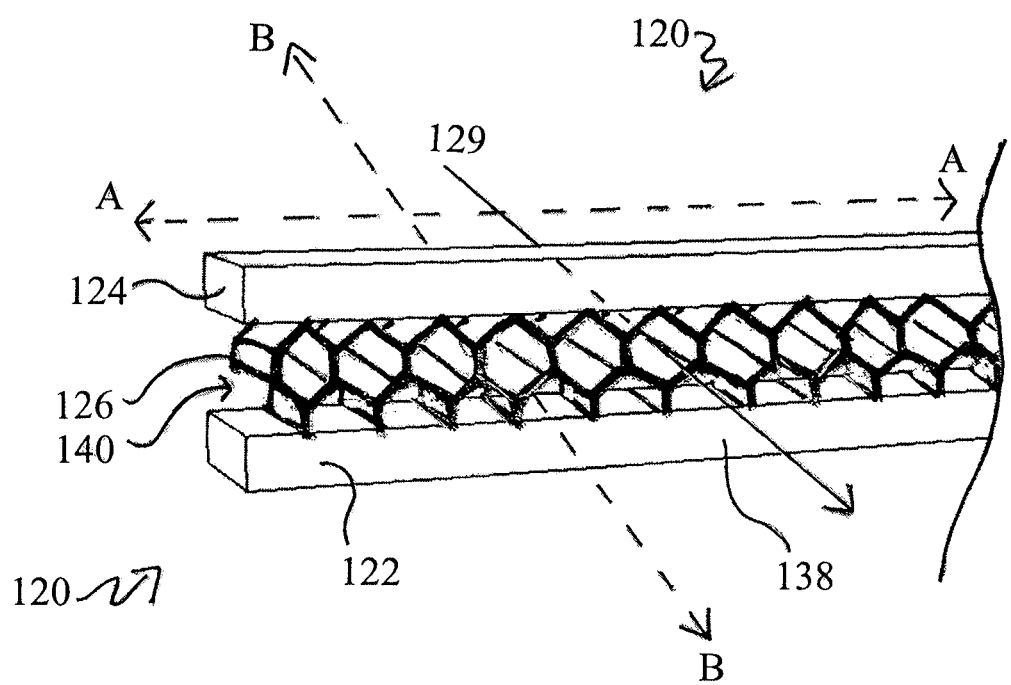
FIGS. 32-33 are close up perspective views of two additional embodiments of specialized shaped engineered matrix members.

Turning to FIG. 32, in a third embodiment of specialized shaped engineered matrix members 120, honeycomb shaped members 138 are constructed by the first and second flat sections 122, 124 of engineered matrix members 120 being joined by a honeycomb web 140 transverse section 126. The honeycomb web 140 is formed by a plurality of honeycomb or other repeating open geometric shapes connected to one another, and arranged such that an axis of opening B-B is disposed perpendicular to a long axis A-A. Similar to the perforated "I" beam shaped members 125 and the truss shaped members 130, the honeycomb web 140 of the honeycomb shaped members 138 facilitates additional air flow and additional pathways 129 for running cables and pipes through the panels 2, especially with the additional pathways diagonally and orthogonally through the specialized shaped engineered matrix members 120.

Figure 33:
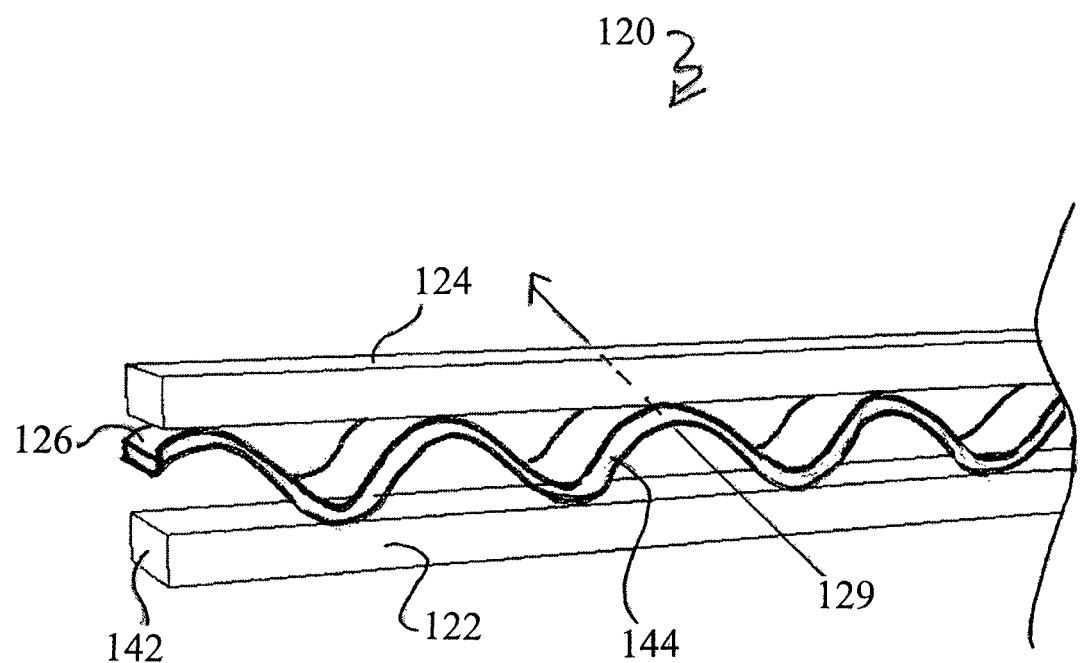

Turning to FIG. 33, in a fourth embodiment of specialized shaped engineered matrix members 120, corrugated shaped members 142 are constructed by the first and second flat sections 122, 124 of engineered matrix members 120 being joined by a corrugated or sinusoidal type curved web 144 transverse section 126. The peaks and the troughs of the corrugated web 144 attach to the inner faces of the first and second flat sections 122, and curving a path in-between. The curved shape of the corrugated web 144 provides a different profile and potentially wider pathways 129 for air flow and running cables, as compared to the truss shaped members 130.

The specialized shaped engineered matrix members 120 may be used in all situations as the rectangular shaped elongate members 14. The specialized shaped engineered matrix members 120 may be formed in a separate process and later attached to the sheets 4,6, or, similar to the integrated elongated members 14A, the specialized shaped engineered matrix members 120 may be formed, in whole or part, together with the sheets 4A, 6A. Panels 2 may be constructed out of all non-engineered spacing structural elements 8, all engineered matrix members 120, or some combination of each.

Wherefore, I claim:

1. A ventilated structural panel comprising:
a first sheet, having a long axis defining a length and a perpendicular short axis defining a width;
a plurality of spacing structural elements, fixedly attached to the first sheet such that the yield strength of the panel is greater than the individual yield strength of the first sheet; and
the plurality of spacing structural elements being formed such that a plurality of unobstructed pathways are created for air to move from at least one edge of the panel to at least one of an opposite and an adjacent edge of the panel;
wherein the first sheet is the only sheet in the panel;
wherein the first sheet is made of one of plywood, Oriented Strand Board, and medium-density fiberboard;
wherein the first sheet is between, 0.125 inches and 1.5 inches in thickness, not including the thickness of any spacing structural elements;
wherein each spacing structural element is
  (a) aligned parallel to other spacing structural elements of the panel, and
  (b) spaced apart from any adjacent spacing structural elements between 1 to 18 times a thickness of the each spacing structural element;
wherein each spacing structural element is equidistance from each adjacent spacing structural element of the panel;
wherein the spacing structural elements are elongated members, and a distance of between 5 and 16 times the width of each elongated member separates each elongated member from each neighboring elongated member of a same layer;
wherein the elongated members are comprised of one of wood, wood composite, and a combination of wood and plastic;
wherein the elongated members extend substantially an entire width or length of the first sheet; and
wherein the elongated members are one of "I" beam shaped and truss shaped.

2. The ventilated structural panel in claim 1, wherein each spacing structural element is formed integrally with the first sheet.

3. The ventilated structural panel in claim 1, wherein each spacing structural element is rectangular shaped.

4. The ventilated structural panel in claim 1, wherein the surface of the first sheet has a plurality of through holes, the holes measuring between 0.0625 inches and 1.5 inches in diameter.

5. The ventilated structural panel in claim 1, wherein each spacing structural element measures between 0.25 inches and 1.50 inches in width.

6. The ventilated structural panel in claim 1 further comprising at least three unobstructed pathways.

7. The ventilated structural panel in claim 6 wherein the plurality of spacing structural elements are arranged such that the panel has a unobstructed airflow of at least approximately 30% of an area of the panel.

8. The ventilated structural panel in claim 6 wherein a length of each of the plurality of spacing structural elements is equal to a width of each of the plurality of spacing structural elements, and the length is at least 2 inches.

9. The ventilated structural panel of claim 6 wherein the spacing structural elements are engineered matrix members.

10. The ventilated structural panel of claim 9 wherein the engineered matrix members are "I" beam shaped, having first and second flat sections joined by a transverse section having a width thinner that a width of each of the first and second flat sections.

11. The ventilated structural panel of claim 9 wherein the engineered matrix members are truss shaped, having first and second flat sections joined by a truss web, the truss web being formed of a plurality of truss web supports, the truss web supports being one of diagonal supports, vertical supports, and both diagonal supports and vertical supports, where the truss web supports are one of cellulosic material, metallic material, and both cellulosic material and metallic material.

12. The ventilated structural panel of claim 9, wherein the panel has a length of at least 24 feet.

13. The ventilated structural panel of claim 9, wherein the panel has a width of at least 16 feet.

14. The ventilated structural panel of claim 9, wherein the panel has a length at least 24 feet and a width of at least 16 feet.

* * * * *